US012226927B2

(12) United States Patent
Crystal et al.

(10) Patent No.: US 12,226,927 B2
(45) Date of Patent: Feb. 18, 2025

(54) CUTTING MACHINE HAVING A REDUCED FORM FACTOR

(71) Applicant: Cricut, Inc., South Jordan, UT (US)

(72) Inventors: Jeremy Burton Crystal, Springville, UT (US); Sterling Kingdon, Cedar Hills, UT (US); Kay Beauwen Freckleton, Draper, UT (US); Adam Worsham, Bountiful, UT (US)

(73) Assignee: Cricut, Inc, South Jordan, UT (US)

( * ) Notice: Subject to any disclaimer, the term of this patent is extended or adjusted under 35 U.S.C. 154(b) by 309 days.

(21) Appl. No.: 17/757,085

(22) PCT Filed: Dec. 11, 2020

(86) PCT No.: PCT/US2020/064546

§ 371 (c)(1),
(2) Date: Jun. 9, 2022

(87) PCT Pub. No.: WO2021/119449

PCT Pub. Date: Jun. 17, 2021

(65) Prior Publication Data

US 2023/0001597 A1 Jan. 5, 2023

Related U.S. Application Data

(60) Provisional application No. 62/947,470, filed on Dec. 12, 2019.

(51) Int. Cl.

| | |
|---|---|
| ***B26D 5/06*** | (2006.01) |
| ***B26D 1/60*** | (2006.01) |
| ***B26D 5/08*** | (2006.01) |
| ***B26F 1/38*** | (2006.01) |

(52) U.S. Cl.

CPC ................ *B26D 5/06* (2013.01); *B26D 1/60* (2013.01); *B26D 5/083* (2013.01); *B26F 1/3813* (2013.01)

(58) Field of Classification Search

CPC . B26D 7/20; B26D 7/06; B26D 7/015; B26D 7/025; B26D 1/60; B26D 5/083; B65J 35/0086

See application file for complete search history.

(56) References Cited

U.S. PATENT DOCUMENTS

| | | | |
|---|---|---|---|
| 11,131,980 | B2 † | 9/2021 | Crystal |
| 2005/0000337 | A1 | 1/2005 | Ahne et al. |

(Continued)

FOREIGN PATENT DOCUMENTS

| | | |
|---|---|---|
| GB | 1231983 A | 5/1971 |
| JP | 1989246098 | 10/1989 |

(Continued)

OTHER PUBLICATIONS

International Preliminary Report on Patentability relating to Applicaiton No. PCT/US2020/064546, dated Jun. 23, 2022.

(Continued)

*Primary Examiner* — Jennifer S Matthews

(74) *Attorney, Agent, or Firm* — Honigman LLP; Grant Griffith

(57) ABSTRACT

A cutting machine includes a working surface, a carriage, a tool, and a drive mechanism. The carriage is disposed above the working surface. The tool is removably secured to the carriage and configured to move (i) toward the working surface along a first axis, (ii) relative to the working surface along a second axis transverse to the first axis, and (iii) relative to the working surface along a third axis transverse to the first axis and the second axis. The drive mechanism is offset from the first axis and configured to move the tool along the first axis.

12 Claims, 19 Drawing Sheets

(56) References Cited

U.S. PATENT DOCUMENTS

| | | | | |
|---|---|---|---|---|
| 2007/0277657 | A1* | 12/2007 | Hilgendorf | B26D 3/16 83/13 |
| 2009/0000444 | A1† | 1/2009 | Johnson | |
| 2013/0180374 | A1* | 7/2013 | Abe | B26D 5/00 83/76.8 |
| 2014/0290459 | A1* | 10/2014 | Hasegawa | B26D 7/2628 83/575 |
| 2015/0174778 | A1* | 6/2015 | Baba | B26D 7/025 83/452 |
| 2016/0303892 | A1 | 10/2016 | Killian et al. | |

FOREIGN PATENT DOCUMENTS

| | | | | |
|---|---|---|---|---|
| JP | 2001063164 | A | 3/2001 | |
| JP | 2008105139 | A | 5/2008 | |
| JP | 2014128836 | A | 7/2014 | |
| JP | 2017177308 | A | 10/2017 | |
| JP | 2018171669 | A | 11/2018 | |
| KR | 100781078 | B1 * | 11/2007 | |
| KR | 101807278 | B1 * | 12/2017 | |
| WO | WO-2016157067 | A1 * | 10/2016 | B26D 1/151 |

OTHER PUBLICATIONS

International Search Report and Written Opinion relating to Applicaiton No. PCT/US2020/064546, dated Apr. 2, 2021.

Japanese Patent Office. Office Action relating to application No. 2022-534335, dated Aug. 10, 2023.

Japanese Patent Office. Office Action relating to application No. 2022-534335, dated Jul. 12, 2024.

* cited by examiner
† cited by third party

CUTTING MACHINE HAVING A REDUCED FORM FACTOR

CROSS-REFERENCE TO RELATED APPLICATIONS

This U.S. patent application claims priority to PCT Application No. PCT/US2020/064546, designating the United States of America, filed on Dec. 11, 2020, which claims the priority under 35 U.S.C. § 119(e) from, U.S. Provisional Application 62/947,470, filed on Dec. 12, 2019. The disclosures of these prior applications are considered part of the disclosure of this application and are hereby incorporated by reference in their entireties.

TECHNICAL FIELD

The disclosure generally relates to electronic cutting systems, methods, and apparatus. In particular, the present disclosure relates to miniaturized electronic cutting machines.

BACKGROUND

This section provides background information related to the present disclosure and is not necessarily prior art.

Throughout history, individuals have found a sense of personal fulfillment, achievement, satisfaction, and expression by creating art. In recent times, during the late 19$^{th}$ century, an art reform & social movement led by skilled tradesmen was slowly starting to be recognized by many people across America, Canada, Great Britain and Australia. This movement has often been referred to as the "arts-and-crafts movement."

The so-called arts-and-crafts movement that began many years ago has continued to evolve today by many persons that may not necessarily be skilled in a particular trade. As such, it may be said that non-skilled persons may be involved in the arts-and-crafts as a social activity or hobby. In some circumstances, the activity or hobby may be practiced for any number of reasons ranging from, for example: economic gain, gifting, or simply to pass time while finding a sense of personal fulfillment, achievement, satisfaction, and expression.

With advances in modern technology, the "arts-and-Crafts Movement" that began many years ago is susceptible to further advancements that may enhance or improve, for example, the way a skilled or non-skilled person may contribute to arts-and-crafts. Therefore, a need exists for the development of improved components, devices and the like that advance the art.

One category of devices being developed and improved are electronic cutting machines, which may also be referred to as vinyl cutters or cutters in general. Currently available electronic cutting machines fall short in a number of aspects affecting user experience and enjoyment.

For example, typical cutting machines are big and heavy, taking up large areas of table/counter surfaces, such as of crafting table surfaces, during use. These machines can be frustrating to use for those who need space for other tools and supplies on a crafting table alongside the cutting machine.

Current cutting machines are sized such that lifting and transporting the machine can be difficult. Because transporting and setting up these machines is burdensome, users often leave these machines out indefinitely in their place without moving them or storing them out of sight between uses.

Cutting machine manufacturers are constantly trying to simplify user interface features to make their machines easy to use for novice crafters and those just starting out in the arts-and-craft movement. Despite this, user interface features of current cutting machines remain complicated and often non-intuitive, which discourages users, especially less experienced crafters, from realizing the full potential of their cutting machines.

Accordingly, there are a number of problems in the art that can be addressed.

SUMMARY

This section provides a general summary of the disclosure, and is not a comprehensive disclosure of its full scope or all of its features.

Each of the above independent implementations of the present disclosure, and those implementations described in the detailed description below, may include any of the features, options, and possibilities set out in the present disclosure and figures, including those under the other independent implementations, and may also include any combination of any of the features, options, and possibilities set out in the present disclosure and figures.

Additional features and advantages of exemplary implementations of the present disclosure will be set forth in the description which follows, and in part will be obvious from the description, or may be learned by the practice of such exemplary implementations. The features and advantages of such implementations may be realized and obtained by means of the instruments and combinations particularly pointed out in the appended claims. These and other features will become more fully apparent from the following description and appended claims or may be learned by the practice of such exemplary implementations as set forth hereinafter.

The details of one or more implementations of the disclosure are set forth in the accompanying drawings and the description below. Other aspects, features, and advantages will be apparent from the description and drawings, and from the claims.

Embodiments of the present disclosure relate generally to electronic cutting systems, methods, and apparatus. In particular, the present disclosure relates to miniaturized cutting machines. For example, in one embodiment of the present disclosure, a cutting machine includes a working surface, a carriage disposed above the working surface, a tool removably secured to the carriage, and an off-axis Z-drive mechanism. The tool is configured to be manipulated up-and-down in a Z-direction, back-and-forth in an X-direction, and forward-and-backward in a Y-direction relative to the working surface. The off-axis Z-drive mechanism is configured to manipulate the tool up-and-down in the Z-direction.

In one embodiment of the present disclosure a cutting machine, includes: a working surface; a passive carriage disposed above the working surface, the passive carriage comprising a first portion and a second portion; a drive belt configured to actuate the passive carriage back-and-forth laterally relative to the workings surface; and an off-axis Z-drive mechanism configured to actuate a first portion of the carriage up-and-down vertically relative to the working surface.

In one embodiment of the present disclosure a cutting machine includes: a working surface; a carriage disposed above the working surface, the carriage including a tool clamp configured to releasably secure a tool to the carriage and the blade clamp comprising a four-bar linkage system having bars rotatably connected via pins. The pins are hidden from view during an operation of the cutting machine.

One aspect of the disclosure provides a cutting machine. The cutting machine may include a working surface, a carriage, a tool, and a drive mechanism. The carriage may be disposed above the working surface. The tool may be removably secured to the carriage and configured to move (i) toward the working surface along a first axis, (ii) relative to the working surface along a second axis transverse to the first axis, and (iii) relative to the working surface along a third axis transverse to the first axis and the second axis. The drive mechanism may be offset from the first axis and configured to move the tool along the first axis.

Implementations of the disclosure may include one or more of the following optional features. In some implementations, the carriage is passive.

In some implementations, the drive mechanism includes a first motor and a shaft. The first motor may be separated from the carriage. The shaft may be coupled to the first motor and the tool and configured to move a front portion of the carriage along the first axis. The drive mechanism may include a drive gear and a drive belt coupled to the first motor and the shaft. The drive gear and the drive belt may be configured to rotate the shaft. The drive gear and the drive belt may be configured to transfer rotary motion of the first motor to the shaft. The shaft may define a double-D cross-sectional shape. The drive gear may define an aperture having a double-D shape. The shaft may be disposed within the aperture. The cutting machine may further include a side portion and a wall. The side portion may be offset from the carriage relative to the second axis. The wall may divide the cutting machine into a front portion and a rear portion. The drive gear and the drive belt may be disposed within the side portion. The first motor may be disposed within the rear portion. The carriage may be disposed within the front portion.

Another aspect of the disclosure provides a cutting machine. The cutting machine may include a working surface, a passive carriage, a drive belt, and a drive mechanism. The passive carriage may be disposed above the working surface. The passive carriage may include a first portion and a second portion. The drive belt may be configured to move the passive carriage in a first direction relative to the workings surface. The drive mechanism may be separated from the passive carriage and configured to move a first portion of the carriage in a second direction relative to the working surface. The second direction may be transverse to the first direction.

Implementations of this aspect of the disclosure may include one or more of the following optional features. In some implementations, the cutting machine includes a side portion and a first motor. The side portion may be offset from the passive carriage in the first direction. The first motor may be disposed behind the passive carriage and configured to drive the drive belt. The drive belt may extend (i) from behind the passive carriage, into the side portion of the cutting machine, and (ii) from the side portion to the passive carriage.

In some implementations, the cutting machine includes a side portion offset from the passive carriage in the first direction. The drive mechanism may include a rack-and-pinion mechanism, a shaft, a drive belt, and a motor. The rack-and-pinion mechanism may be coupled to the passive carriage. The shaft may engage the rack-and-pinion mechanism. The drive belt may be disposed within the side portion. The motor may be disposed behind the passive carriage and outside of the side portion. The motor may be configured to rotate the shaft via the drive belt and one or more gears. The shaft may define a double-D cross-sectional shape. A first gear of the one or more gears may define an aperture having a double-D shape. The shaft may be disposed within the aperture.

In some implementations, the passive carriage includes a vertical guide bar extending behind the passive carriage and secured to the second portion of the passive carriage. The first portion of the passive carriage may include an arm extending rearward from the first portion through the second portion. The arm may be slidably engaged with the vertical guide bar. The second portion of the passive carriage may include an opening. The arm of the first portion may extend through the opening.

Yet another aspect of the disclosure provides a cutting machine visible along a line of sight. The cutting machine may include a working surface and a carriage. The carriage may be disposed above the working surface. The carriage may include a tool clamp configured to secure a tool to the carriage. The tool clamp may include a first bar and a second bar. The second bar may be pivotally coupled to the first bar by a first pin intersecting the line of sight. The first bar may be operable to move between (i) a first orientation intersecting the line of sight and (ii) a second orientation offset from the line of sight.

Implementations of this other aspect of the disclosure may include one or more of the following optional features. In some implementations, the tool clamp includes a third bar and a fourth bar. The third bar may be pivotally coupled to the second bar. The fourth bar may be pivotally coupled to the third bar. The first bar, the second bar, the third bar, and the fourth bar may not form a cam-follower surface during movement of the first bar between the first orientation and the second orientation.

In some implementations, at least one of the first bar or the second bar is formed at least in part from a glass-filled nylon.

In some implementations, at least one of the first bar or the second bar is formed at least in part from a glass-filled polycarbonate.

Yet a further aspect of the disclosure provides a cutting assembly. The cutting assembly may include a first drive mechanism, a second drive mechanism, and a carriage. The carriage may include a front portion and a rear portion. The front portion may be operatively coupled to the first drive mechanism. The rear portion may be coupled to the front portion and operatively coupled to the second drive mechanism. The rear portion may be configured to move (i) with the front portion in a first direction upon actuation of the second drive mechanism and (ii) relative to the front portion in a second direction transverse to the first direction upon actuation of the first drive mechanism. The second portion may be disposed between the first portion and at least one of the first drive mechanism or the second drive mechanism.

Implementations of this further aspect of the disclosure may include one or more of the following optional features. In some implementations, the second drive mechanism includes a drive gear and a drive belt offset from the carriage in the first direction. The first drive mechanism may be offset from the carriage in the second direction.

Each of the above independent aspects of the present disclosure, and those aspects described in the detailed description below, may include any of the features, options, and possibilities set out in the present disclosure and figures, including those under the other independent aspects, and may also include any combination of any of the features, options, and possibilities set out in the present disclosure and figures.

Additional features and advantages of exemplary aspects of the disclosure will be set forth in the description which follows, and in part will be obvious from the description, or may be learned by the practice of such exemplary aspects. The features and advantages of such aspects may be realized and obtained by means of the instruments and combinations particularly pointed out in the appended claims. These and other features will become more fully apparent from the following description and appended claims or may be learned by the practice of such exemplary aspects as set forth hereinafter.

DESCRIPTION OF DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

Corresponding reference numerals indicate corresponding parts throughout the drawings.

DETAILED DESCRIPTION

The present disclosure relate generally to electronic cutting systems, methods, and apparatus. In particular, the present disclosure relates to miniaturized electronic cutting machines and provides technical solutions to a number of technical problems in the art discussed above.

For example, in one aspect of the cutting machines disclosed herein, the machines are small enough to be stored on a counter or table surface, such as a crafting table surface, while maximizing space available for other crafting tools and supplies.

Alternatively, the cutting machines described herein can be easily placed within a standard sized drawer or cupboard within a home for convenient storage. Along these lines, the cutting machines described herein are small and light weight so as to be easily moved from one place to another. The cutting machines described herein are thus portable and easy to set up and take down before and after use.

Furthermore, in one aspect of the cutting machines described herein, the machines are simple to use with minimal or no user interface buttons or complications. Accordingly, the cutting machines of the present disclosure are readily usable by experienced crafters and novices alike.

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

Figure 1A:
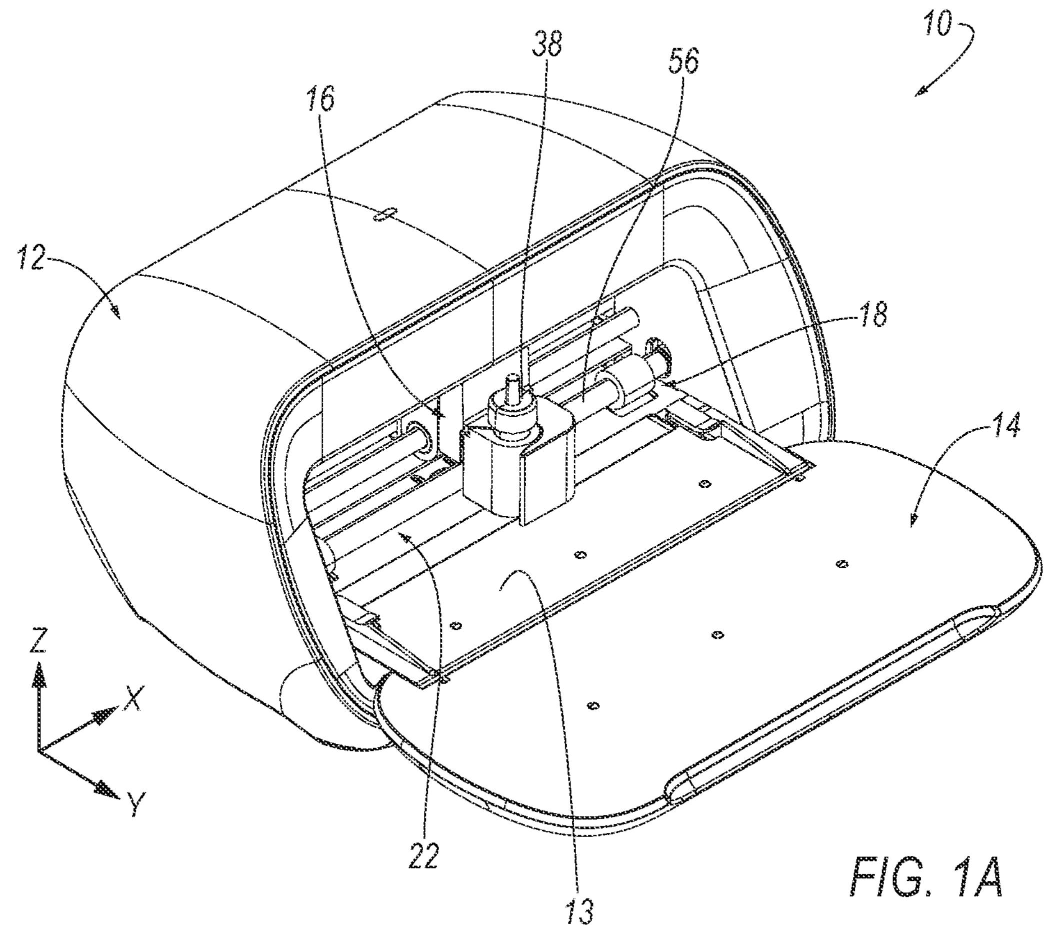
FIG. 1A is a front perspective view of an exemplary cutting machine with a door arranged in an open orientation to receive material, according to the principles of the present disclosure.
Figure 1B:
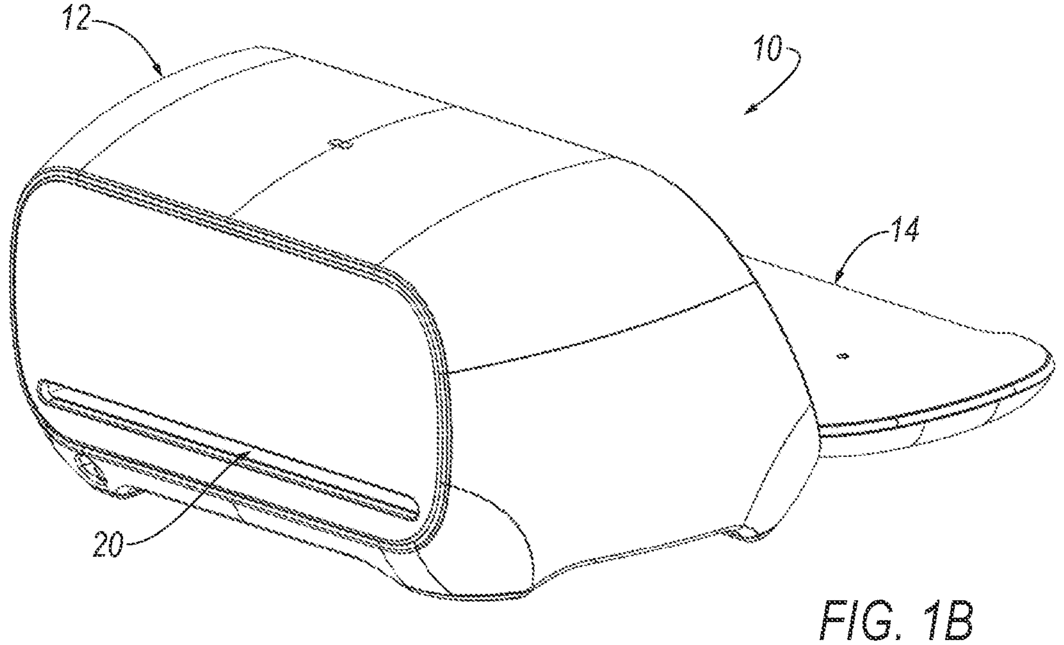
FIG. 1B is a rear perspective view of the cutting machine of FIG. 1A.
Figure 2:
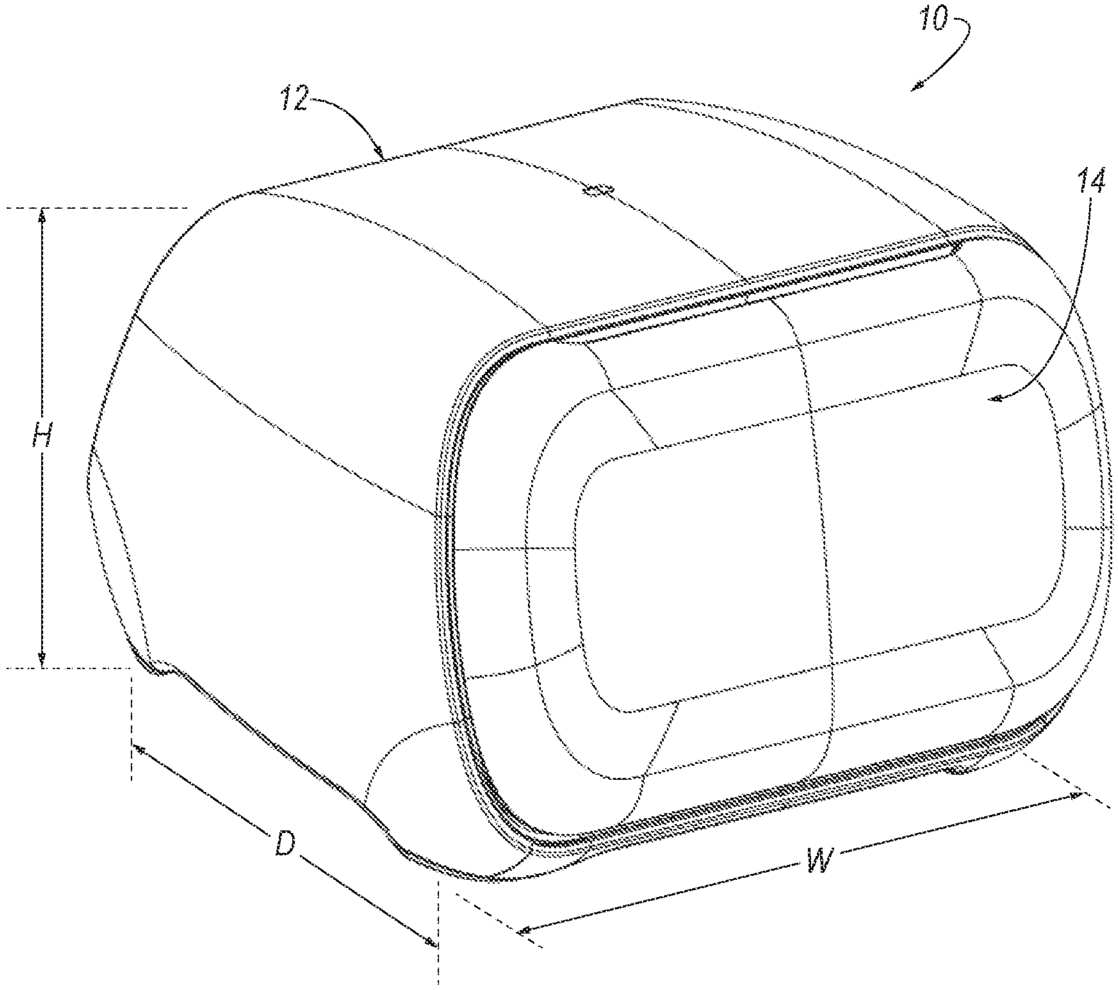
FIG. 2 is a front perspective view of the cutting machine of FIG. 1A with the door arranged in a closed orientation.
Figure 3:
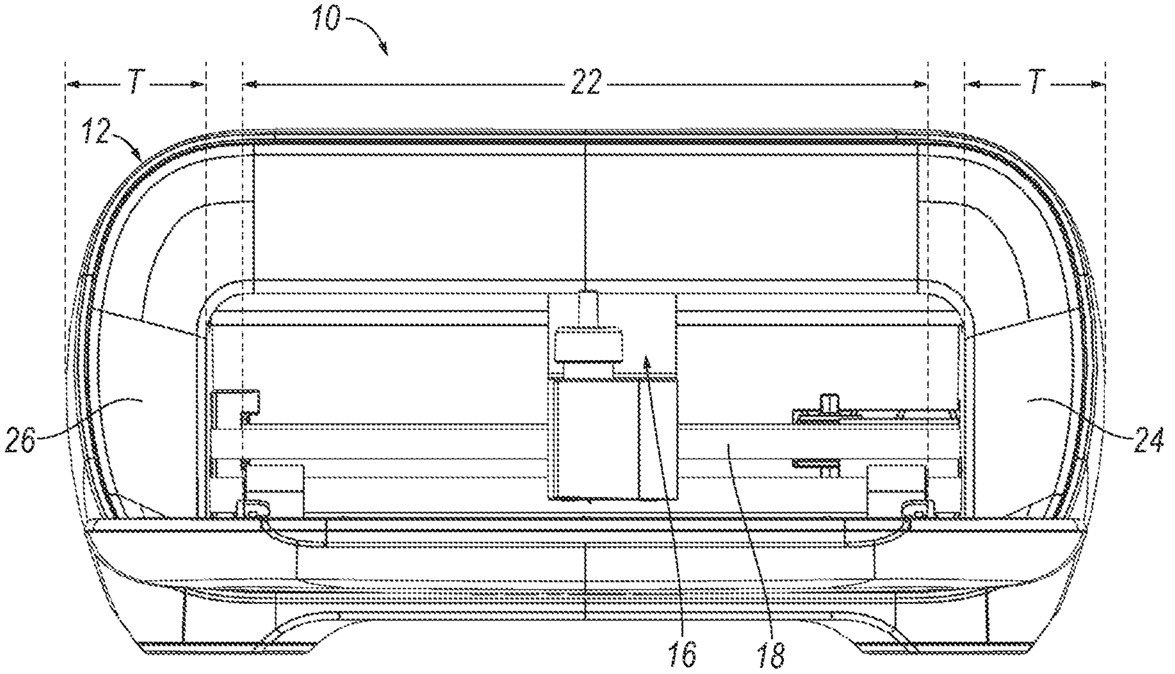
FIG. 3 is a front view of the cutting machine of FIG. 1A.

With reference to FIGS. 1A, 1B, 2, and 3, implementations of the present disclosure relate generally to a cutting machine 10, components thereof, and methods of use. The cutting machine 10 includes an outer housing 12 and a door 14. The door 14 may be arranged in one of a closed orientation (see, e.g., FIG. 2) and an open configuration (see, e.g., FIGS. 1A, 1B, and 3). When the door 14 is arranged in the open configuration, a workpiece (see, e.g., workpiece 100 at FIGS. 21-24 that may be defined by an upper layer of workpiece material 102 and a lower layer of workpiece support material 104) to be inserted into the cutting machine 10. The door 14 may be selectively opened and closed via a hinge mechanism (not shown) where the door 14 is connected to outer housing 12 of the cutting machine 10. As seen at FIGS. 1A and 3 a plurality of exemplary internal cutting components of the cutting machine 10 may include, for example, one or more of a carriage 16, a roller assembly 18, or the like.

The workpiece (e.g., workpiece 100 in FIG. 23) that is to be fed into the cutting machine 10 is at least partially supported on a working surface 13 as a tool 38 impinges thereon. In some configurations, an upwardly-facing surface of the door 14 can also define or act as another portion of the working surface 13 supporting the workpiece 100 that is fed through the cutting machine 10. As the workpiece 100 is fed forward-and-backward by the roller assembly 18, the carriage 16, which manipulates the tool 38, such as, for example, a cutting blade, selectively impinges downwardly onto the workpiece 100. The carriage 16 can also move back-and-forth across the workpiece 100 to form one or more cuts (see, e.g., cut C at FIG. 23A) at any region of the workpiece 100. Although a tool 38 is shown at, for example, FIG. 23A as being a cutting tool 38 (e.g., a blade), the cutting machine 10 is not limited to the tool 38 including a cutting blade, and, as such, other tools may also be secured to and manipulated by the carriage 16. For example, in some configurations, the cutting tool 38 may be replaced with another tool, such as, for example, a scoring tool, an ink pen, or other tool configured to add to, take away from, or otherwise alter the upper layer of workpiece material 102 of the workpiece 100 as the workpiece 100 is fed through the cutting machine 10.

In some instances, the roller assembly 18 may move the workpiece 100 forward-and-backward in the Y-direction as the carriage 16 moves back and forth laterally in the X-direction. The X-direction and the Y-direction described above may be reference from an X-Y-Z coordinate system seen at FIG. 1A.

In some implementations, the tool 38 may be housed within, contained within, or movably-manipulated by the carriage 16 upwardly-and-downwardly in a vertical direction (i.e., a Z-direction) relative to the working surface 13 and the workpiece 100. The Z-direction is also referenced from the X-Y-Z coordinate system of FIG. 1A.

With reference to FIG. 1B, the outer housing 12 defines a pass-through slot 20 that allows the workpiece 100 being cut or fed through the cutting machine 10 to pass through the cutting machine 10 without limiting a length (see, e.g., length $L_{100}$ of the workpiece 100 at FIGS. 22-24) of the upper layer of workpiece material 102 of the workpiece 100 being cut by the cutting machine 10. During operation, upper layer of workpiece material 102 of the workpiece 100 being cut can pass into and out of the pass-through slot 20, as needed, depending on the length $L_{100}$ of the workpiece 100 and the pattern being cut C (see, e.g., cut C in FIG. 23A) into the upper layer of workpiece material 102 of the workpiece 100. Thus, embodiments of the cutting machine 10 described herein may include internal cutting components and other operating components such as, for example, motors (i.e., a Z-direction motor 30, an X-direction motor 32, and a Y-direction motor 34), gears, belts, and other electronics, arranged so as to not interfere with the workpiece 100 passing all the way through the cutting machine 10 during use.

In some configurations, the cutting machine 10 of the present disclosure may be sized in a "miniaturized" fashion such that the cutting machine 10 is sized in a manner to define a small, compact form for ease of use. Accordingly, the terms "compact," "miniaturized," "small," "portable," or other similar terms used herein to describe the size of cutting machine 10 are not meant as limiting; rather, these terms are used to reference electronic cutting machines generally appropriate for individual consumer use within a home or workplace. As such, the cutting machine 10 of the present disclosure are may be light weight, portable, and easily operated by an untrained person.

Dimensions described herein with reference to the cutting machine 10 are given only as examples of the general size and scale of the cutting machine 10. For instance, by way of a non-limiting example, at least one embodiment of the cutting machine 10 described herein may have the following dimensions; accordingly, as seen at FIG. 2: a height H of about (e.g., +/−10%) 3-to-6 inches; a width W of about (e.g., +/−10%) 6-to-10 inches; and a depth D of about (e.g., +/−10%) 4-to-6 inches. The referenced dimensions of FIG. 2 are non-limiting and meant to give only an exemplary scale of the cutting machine 10 described herein. One or more other embodiments of the cutting machine 10 may deviate from any or all of the above-referenced dimension while providing a portable, light weight, consumer-friendly cutting machine 10 appropriate for arts-and-craft applications, which include all the advantages of miniaturization noted herein.

As seen at FIGS. 1A-2, the cutting machine 10 may be mostly, if not completely, void of any user interface buttons or screens. In some configurations, the cutting machine 10 is configured to be controlled remotely, for example, from a computer or mobile device, via wired and/or wireless communication methods. In this way, the cutting machine 10 simplifies the user's experience and presents a clean, aesthetically pleasing device.

With reference to FIGS. 1A and 3, because the cutting machine 10 is configured with such a relatively small form factor, the design of the cutting machine 10 maximizes available cutting space of a cavity 22 defined by the outer housing 12. The cavity 22, as referred to herein, may be generally defined by a lateral dimension along which the tool 38 secured within or supported by the carriage 16 can cut or otherwise manipulate the workpiece 100 that is fed into the cutting machine 10. A front view of the cutting machine 10 of FIG. 3 with the door 14 arranged in the open orientation reveals a lateral dimension or lateral limit of the cavity 22 that may define a lateral cutting area. Accordingly, the cavity 22 represents the limitations of a lateral (X-direction) space into which the workpiece 100 may be inserted and subjected to manipulation (e.g., cutting) by the tool 38 secured within or supported by the carriage 16. In order to maximize the lateral cutting area that is limited by the available space associated with the cavity 22, the internal components (e.g., including motors (i.e., a Z-direction motor 30, an X-direction motor 32, and a Y-direction motor 34), gears, shafts, electronics, and other components) are arranged in such a way so as to minimize a thickness T of a left side portion 26 of the outer housing 12 and a right-side portion 24, respectively, of the outer housing 12.

Figure 4:
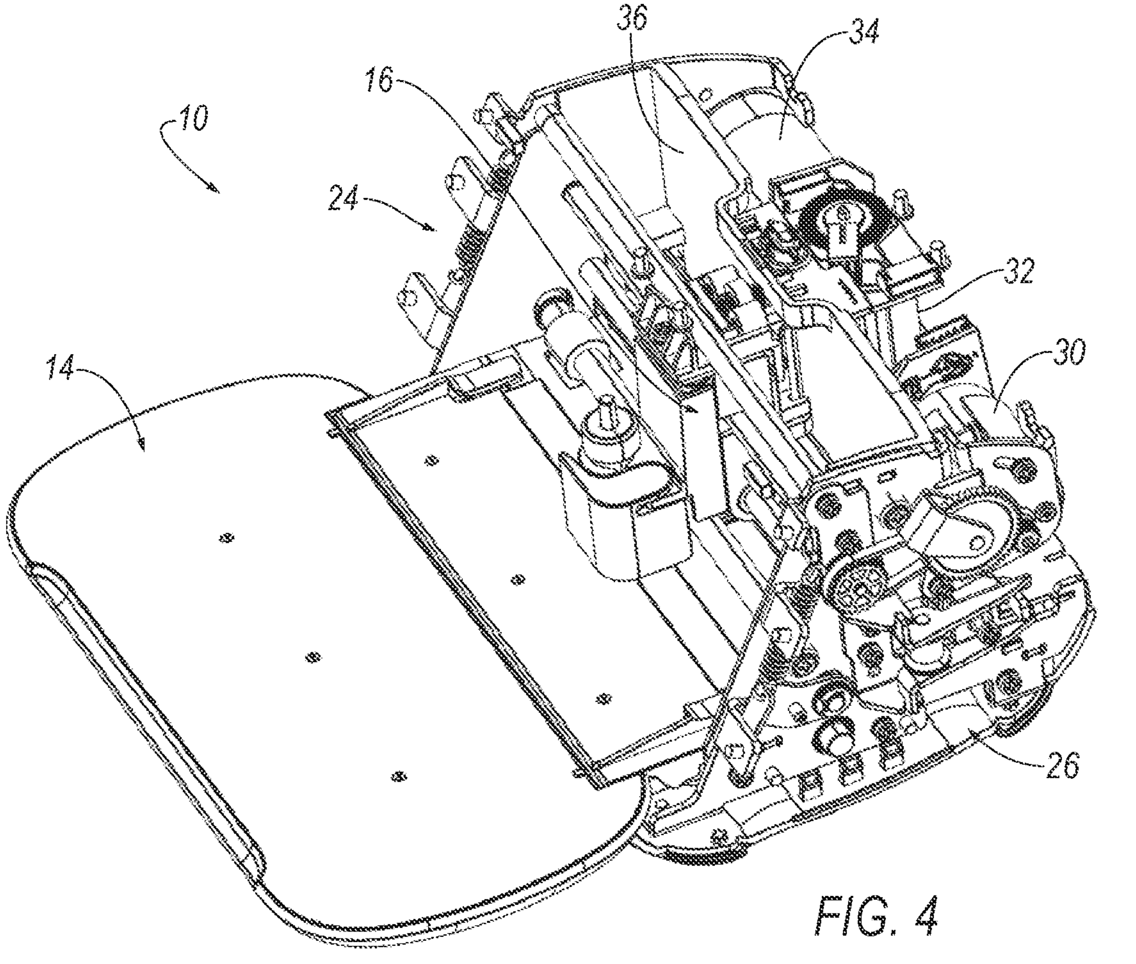
FIG. 4 is another front perspective view of the cutting machine of FIG. 1A with an outer housing removed in order to illustrate an exemplary arrangement of internal working components of the cutting machine, according to the principles of the present disclosure.

With reference to FIG. 4, the outer housing 12 is removed in order to illustrate an exemplary configuration of a plurality of internal components of the cutting machine 10. As shown, in order to minimize the thickness T of the right-side portion 24 of the outer housing 12 and the left-side portion 26 of the outer housing 12, some of the more voluminous or larger components of the plurality of internal components of the cutting machine 10, such as, for example, motors (i.e., a Z-direction motor 30, an X-direction motor 32, and a Y-direction motor 34), circuit boards, and drive gears are disposed rearwardly (i.e.: (1) away from the door 14, which is located near the front side of the cutting machine 10; and (2) behind the carriage 16 rather than being disposed laterally within the right-side portion 24 of the outer housing 12 and the left-side portion 26 of the outer housing 12.

In some configurations, the cutting machine 10 may include a plurality of motors 30, 32, 34 (e.g., three motors defined by, for example, a Z-direction motor 30, an X-direction motor 32, and a Y-direction motor 34) that are disposed behind the carriage 16 and separated by an interior housing or wall portion 36 of the cutting machine 10. As seen at FIGS. 4-8, the plurality of motors include a motor for actuation in each direction of the three directions associated with the X-Y-Z coordinate system of FIG. 1A. For example, a first motor 30 (i.e., a "Z-direction motor") is configured to actuate the carriage 16 in the Z-direction of the X-Y-Z coordinate system of FIG. 1A via one or more gears, belts, and shafts. In a further example, a second motor 32 (i.e., an "X-direction motor") is configured to actuate the carriage 16 in the X-direction of the X-Y-Z coordinate system of FIG. 1A via one or more gears, belts, and shafts. In yet another example, a third motor 34 (i.e., a "Y-direction motor") is configured to actuate the carriage 16 in the Y-direction of the X-Y-Z coordinate system of FIG. 1A via one or more gears, belts, and shafts. More detail regarding the specific components that transfer the rotation from the shaft of the Z-direction motor 30 to vertical actuation of the carriage 16 will be given hereafter; however it is simply noted here that the relatively bulky Z-direction motor 30 itself is disposed behind the carriage 16 and less bulky gears, belts, and other components that transfer motion to the carriage 16 are arranged within the left-side portion 26 of the outer housing 12. Because such belts, gears, and other components disposed within the left-side portion 26 of the outer housing 12 and can be arranged flat and relatively co-planar with one another, the thickness T of the left-side portion 26 of the outer housing 12 is minimized.

The same is true for components disposed within right-side portion 24 of the outer housing 12, which, according to some implementations, accommodated gears and belts that transfer rotational motion from Y-direction motor 34 to the roller assembly 18 that actuates the workpiece 100 back-and-forth in the Y-direction of the X-Y-Z coordinate system of FIG. 1A. Similar to the Z-direction motor 30, the Y-direction motor 34 is disposed behind the carriage 16 rather than to the side within one of the right-side portion 24 of the outer housing 12 of the left-side portion 26 of the outer housing 12, thus reducing the lateral (X-direction) form factor of the cutting machine 10 and maximizing the cutting space of the cavity 22 of the outer housing 12.

Likewise, the X-direction motor 32 is disposed behind the carriage 16, with drive gears, belts, and other drive components, which actuate the carriage 16 back-and-forth laterally in the X-direction of the X-Y-Z coordinate system of FIG. 1A, is disposed within the left-side portion 26 of the outer housing 12. To the extent that one or more components of the plurality of components are disposed within the right-side portion 24 of the outer housing 12 and the left-side portion 26 of the outer housing 12, the one or more components of the plurality of components are not necessarily limited as such. For example, various gears, belts, or other drive components in connection with the Z-direction motor 30 could alternatively be disposed within right-side portion 24 of the outer housing 12. The same applies to other components of the plurality of components associated with the X-direction motor 32 and the Y-direction motor 34.

With reference back to FIG. 3, as a non-limiting example, the thickness T of the right-side portion 24 of the outer housing and the left-side portion 26 of the outer housing 12 may be, in some configurations, less than about 2-inches, or, in other configurations, less than about 1.5-inches, or, in yet other configurations, about 1-inch or less. The thickness T of the right-side portion 24 of the outer housing 12 or the left-side portion 26 of the outer housing 12 may be more or less than the above-described dimensions without departing from the characteristics and small form factor of the right-side portion 24 of the outer housing and the left-side portion 26 of the outer housing 12 described herein.

Figure 5:
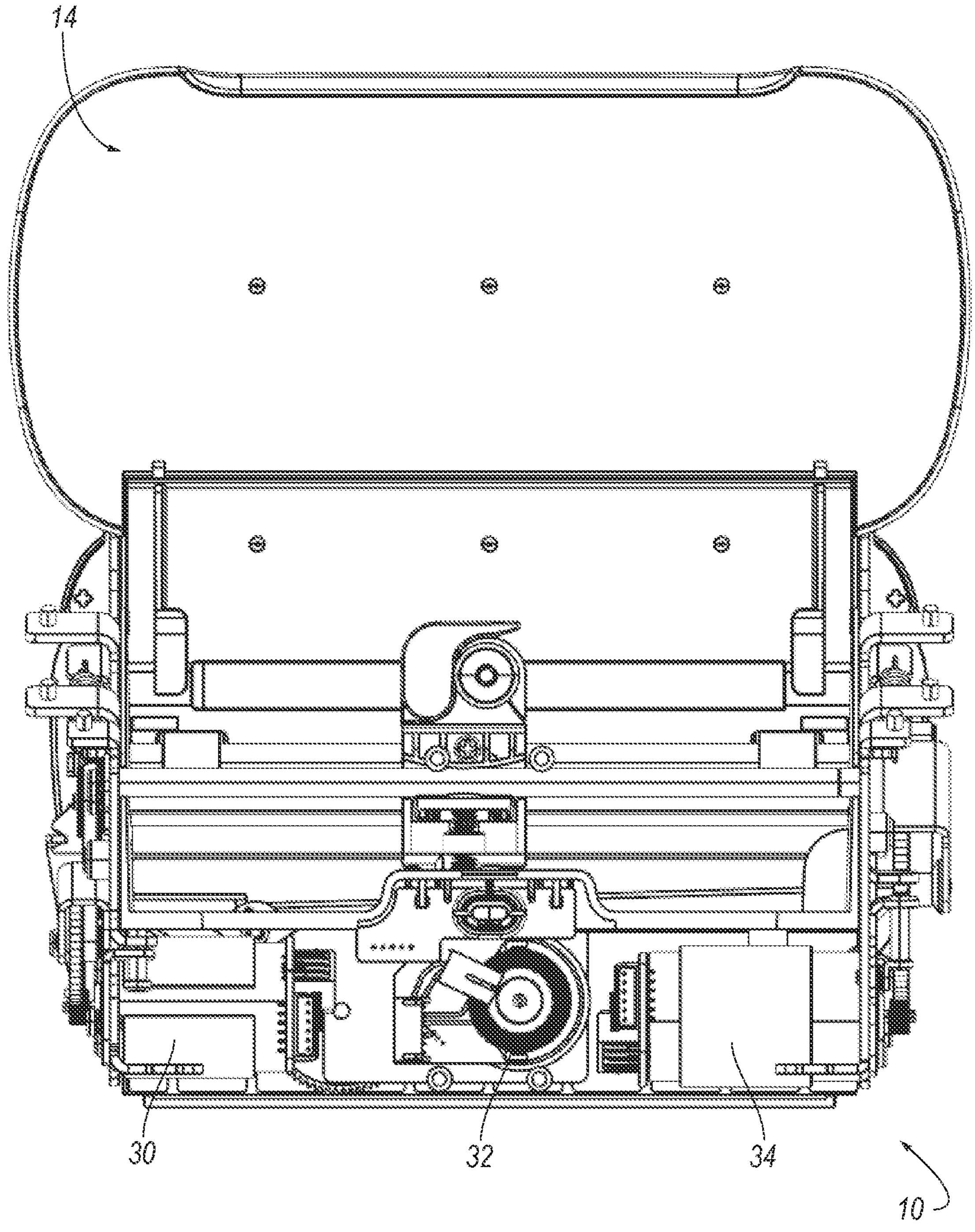
FIG. 5 is a top view of the cutting machine of FIG. 1A with the outer housing removed in order to illustrate an exemplary arrangement of internal working components of the cutting machine, according to the principles of the present disclosure.
Figure 6:
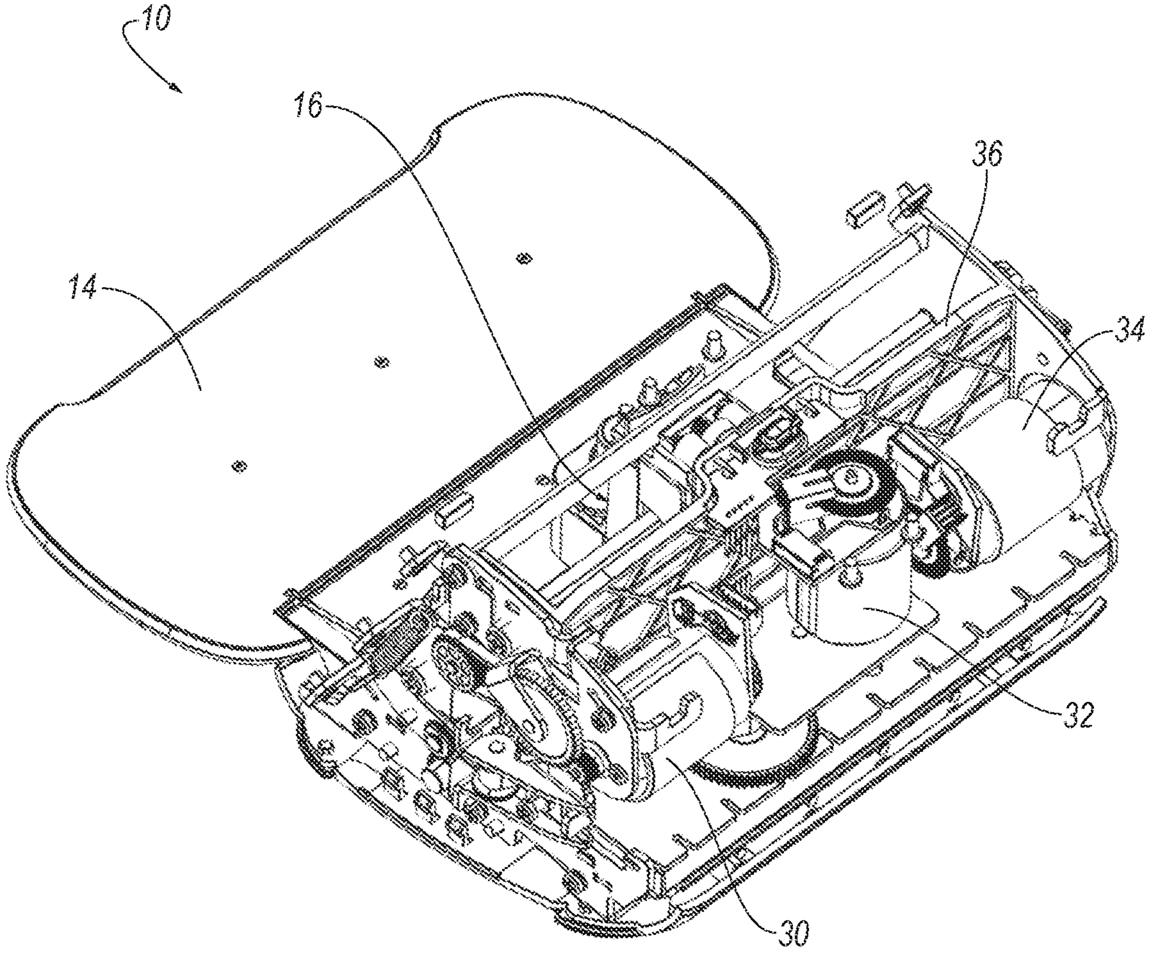
FIG. 6 is a rear perspective view of the cutting machine of FIG. 1A with the outer housing removed in order to illustrate an exemplary arrangement of internal working components of the cutting machine, according to the principles of the present disclosure.
Figure 7:
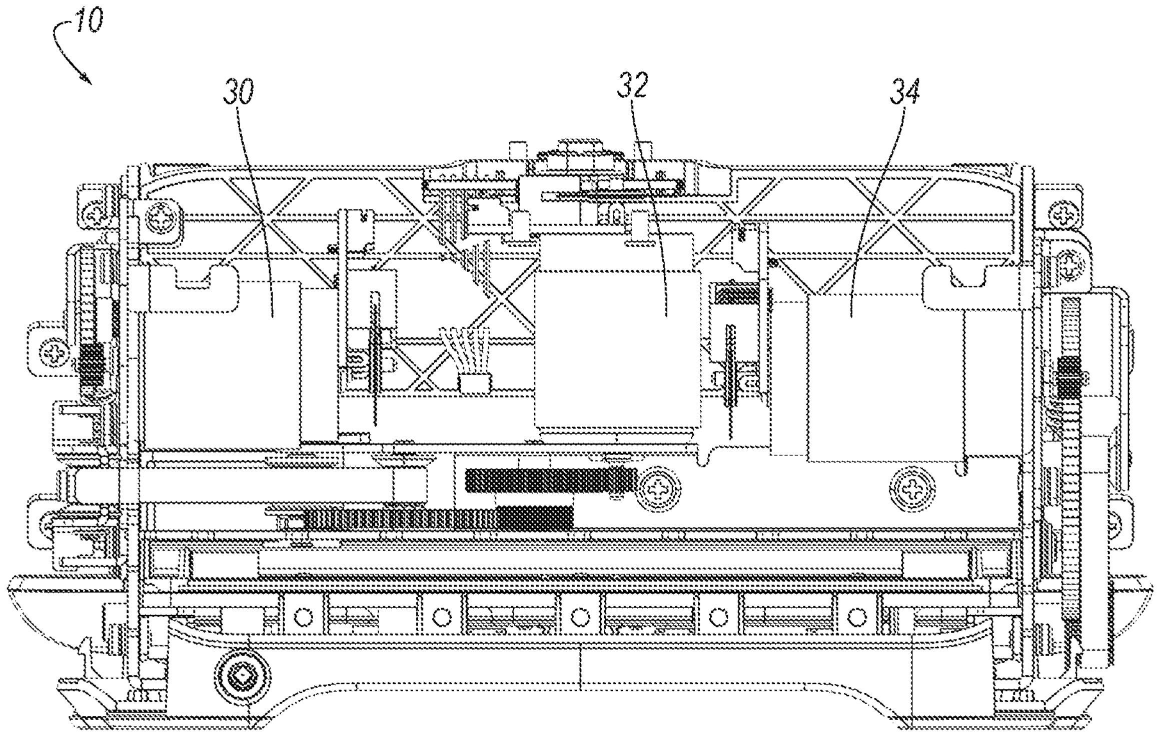
FIG. 7 is a rear view of the cutting machine of FIG. 1A with the outer housing removed in order to illustrate an exemplary arrangement of internal working components, according to the principles of the present disclosure.

Referring to FIG. 5, a top view of the cutting machine 10 without the outer housing 12 is shown. From this top view, the rearward positions of the Z-direction motor 30, the X-direction motor 32, and the Y-direction motor 34, relative to the carriage 16, are shown. Along these same lines, FIG. 6 illustrates a similar configuration from a rear perspective view, and FIG. 7 illustrates a rear view of the cutting machine 10 without the outer housing 12.

The Z-direction motor 30, which controls movement of the carriage 16 in the Z-direction of the X-Y-Z coordinate system of FIG. 1A, the drive mechanism(s) is arranged completely off-axis; this "off-axis Z-drive configuration" allows for a completely passive carriage (i.e., the carriage 16 does not include any active drive motors, wires, or other drive components); this allows for implementation of a relatively small sizing of the carriage 16 that advantageously fits within the small form factor of the cutting machine 10 and cutting space of the cavity 22. Rather than Z-drive components being disposed on the carriage 16 (i.e., components actuating movement of the carriage 16 in the Z-direction of the X-Y-Z coordinate system of FIG. 1A), the carriage 16 is passively being actuated from motors, gears, and belts disposed behind the carriage 16 or within the right-side portion 24 of the outer housing 12 or the left-side portion 26 of the outer housing 12. In this way, the carriage 16 remains light-weight and small, and the Z-direction motor 30, the X-direction motor 32, and the Y-direction motor 34 are fixed in position elsewhere within the cutting machine 10.

Figure 8:
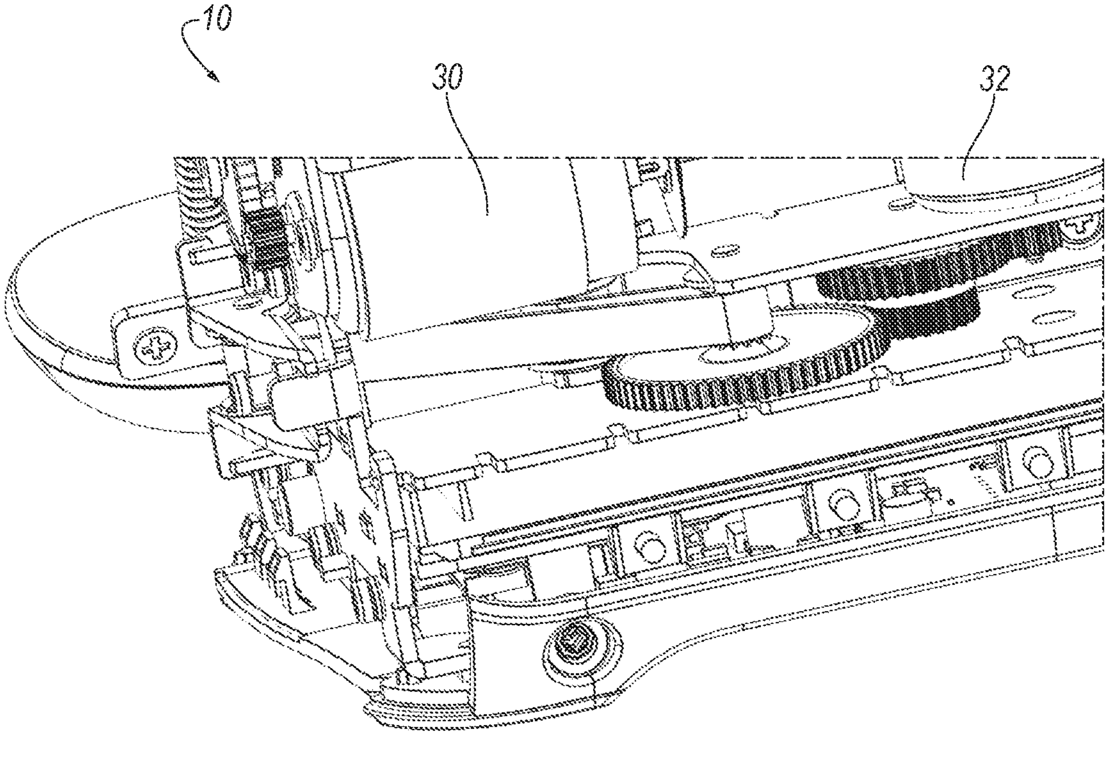
FIG. 8 is a close-up rear perspective view of an exemplary portion of a belt drive of a cutting machine, according to the principles of the present disclosure.
Figure 9:
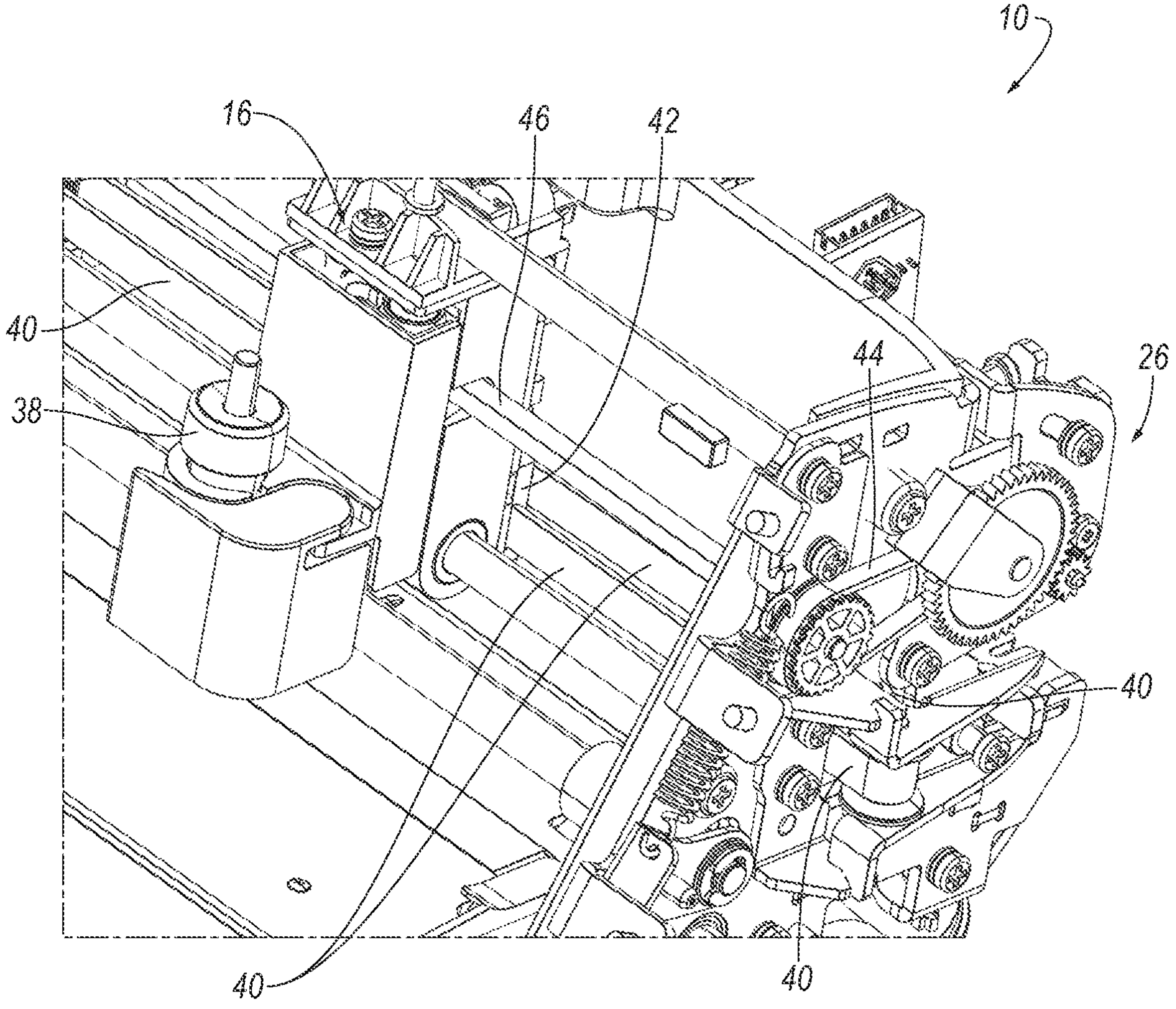
FIG. 9 is a close-up front perspective view of an exemplary portion of a belt drive of a cutting machine, according to the principles of the present disclosure.

Attention will now be directed toward the specifics of how each motor of the plurality of motors 30, 32, 34 actuates the positioning or movement of the tool 38 (such as, for example, the cutting blade) relative to the workpiece 100 that is fed into the cutting machine 10 between roller bars 54, 56 of the roller assembly 18. Regarding X-direction actuation of the carriage 16, the X-direction motor 32 rotates a set of gears that drives a belt 40, as shown at FIG. 8. With reference to FIG. 9, the belt 40 extends into the left-side portion 26 of the outer housing 12 and across the cutting space of the cavity 22 and into the right-side portion 24 of the outer housing 12. The belt 40 secures to the carriage 16 at a rear portion 42 of the carriage 16. As the X-direction motor 32 drives the belt 40 back-and-forth, the carriage 16 is driven back-and-forth laterally in the X-direction of the X-Y-Z coordinate system of FIG. 1A.

Figure 10A:
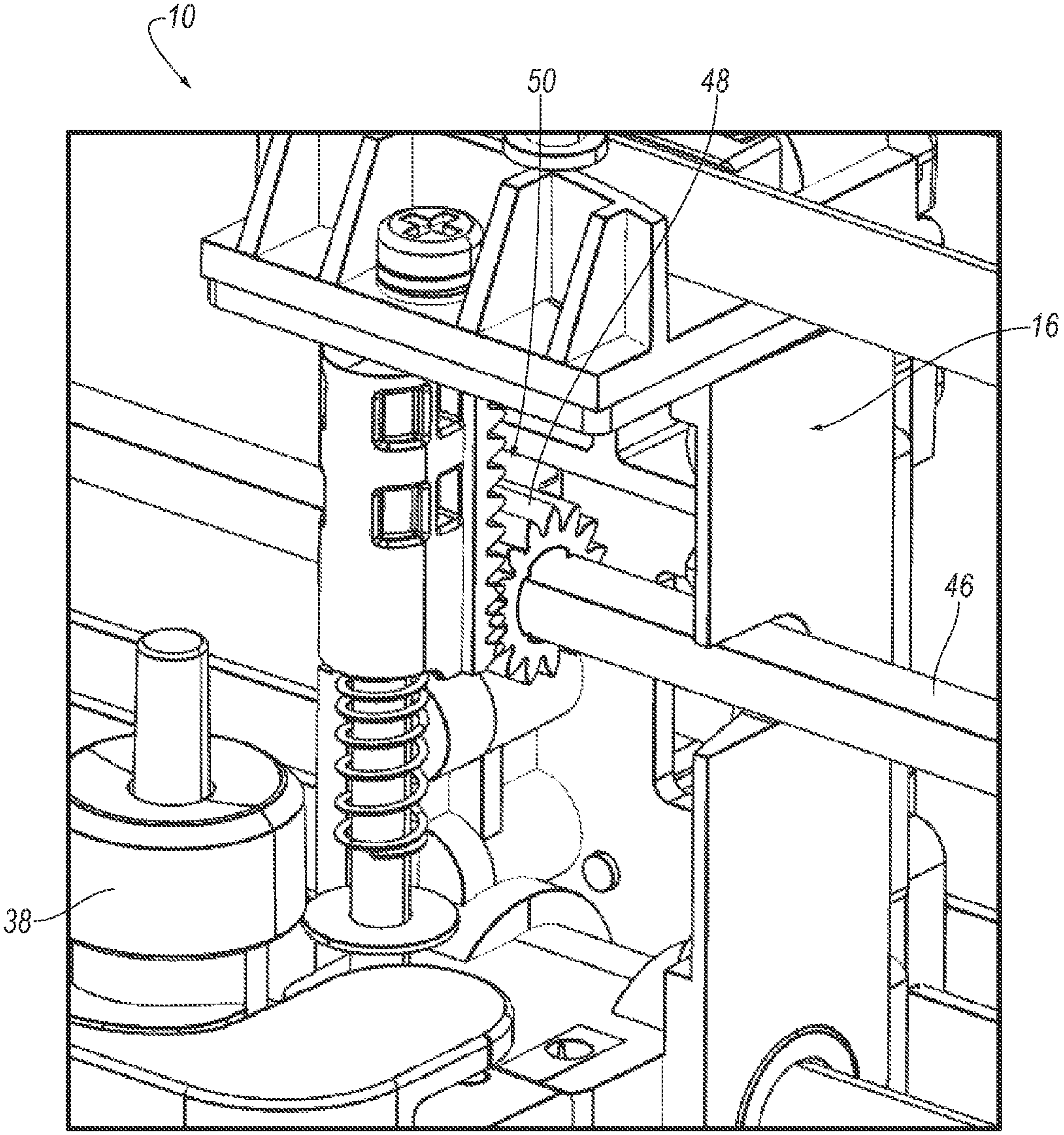
FIG. 10A is illustrates a close-up perspective view of an exemplary rack-and-pinion gear of a cutting machine that is configured to drive a cutting blade in a vertical direction, according to the principles of the present disclosure.

The off-axis Z-drive of the carriage 16 discussed above also utilizes a belt 44, which drives a keyed shaft 46, which herein may be referred to as a "double D-shaft" that is secured to a pinion gear 48 as part of a rack-and-pinion mechanism arranged inside of the carriage 16. The belt 44, the double D-shaft 46, and the rack-and-pinion mechanism 50 are shown at FIGS. 9 and 10A. With reference to FIG. 10A, a front portion of the carriage 16 has been removed in order to illustrate the rack-and-pinion mechanism 50. The rack-and-pinion mechanism 50 translates the rotational motion of the double D-shaft 46 to a vertical motion in the Z-direction of the tool 38 that is secured within or supported by the carriage 16.

Figure 10B:
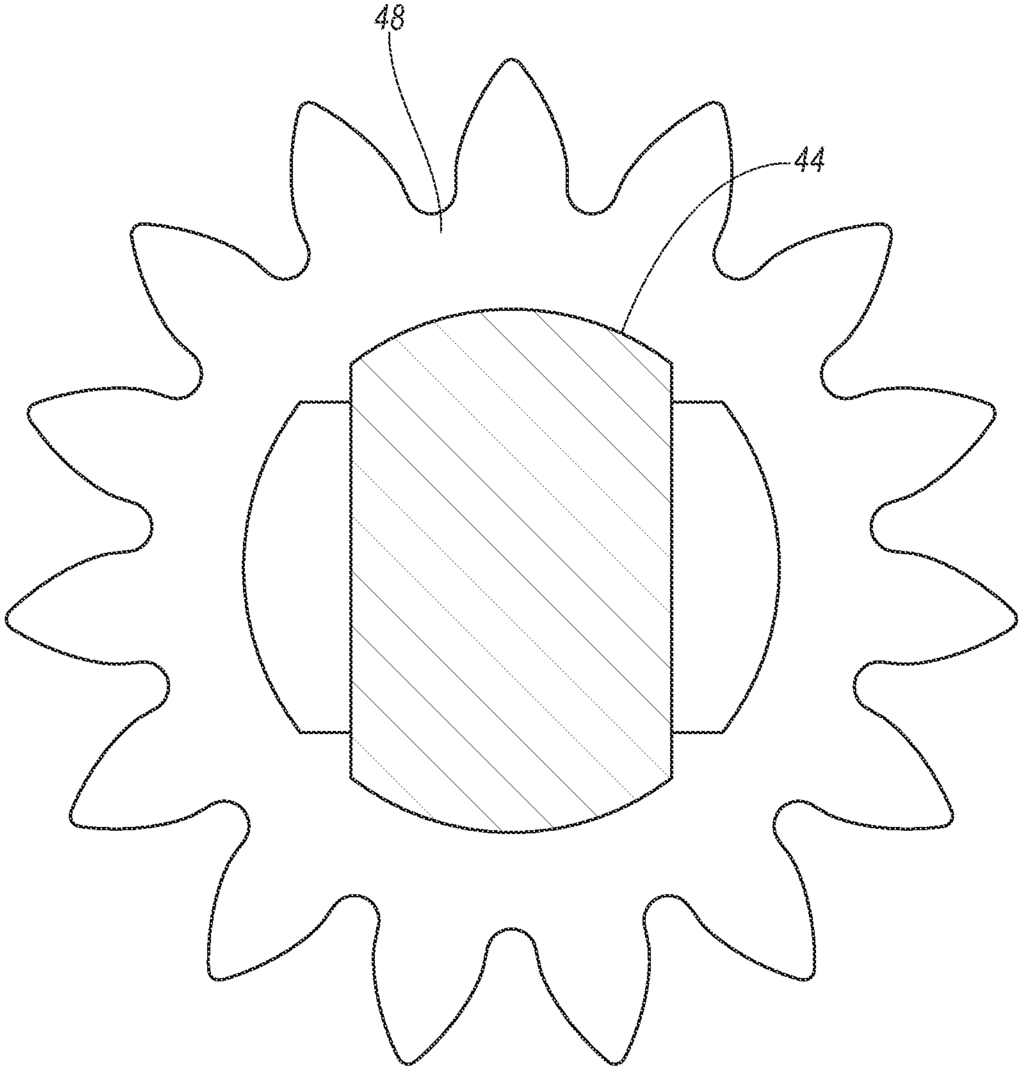
FIG. 10B is a cross-sectional view of an exemplary double D-shaft engaging the pinion gear of FIG. 10A, according to the principles of the present disclosure.

As shown from the cross-sectional view of FIG. 10B, the double D-shaft 46 includes opposing flat sides that form four corners, each of which engage the pinion 48 at four respective contact points. The dual flat-sided configuration of the double D-shaft 46 provides added contact with the pinion 48, which reduces the forces at each contact point and reduces wear between the two components.

In general, the belts 40, 44 used within the cutting machine 10 provide a number of advantages, including, for example, the minimization of form factor of the right-side portion 24 of the outer housing 12 and the left-side portion 26 of the outer housing (i.e., the belts 40, 44 tend to take up less space laterally within the right-side portion 24 of the outer housing 12 and the left-side portion 26 of the outer housing 12) and lend to a thinner form factor compared to gears. Accordingly, by minimizing the number of gears through the use of the belts 40, 44 rather than all gears also reduces unwanted backlash in the control system of the carriage 16.

Figure 11:
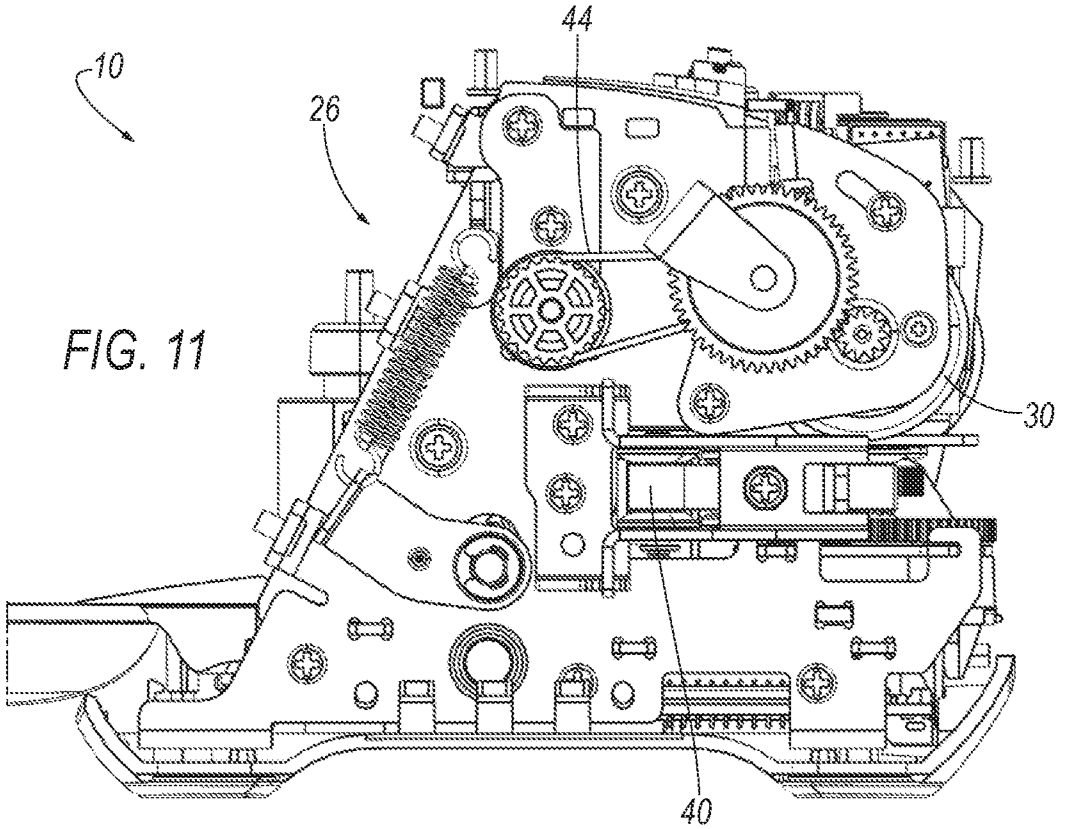
FIG. 11 is a right side view of a cutting machine with the outer housing removed in order to illustrate an exemplary arrangement of internal working components, according to the principles of the present disclosure.
Figure 12:
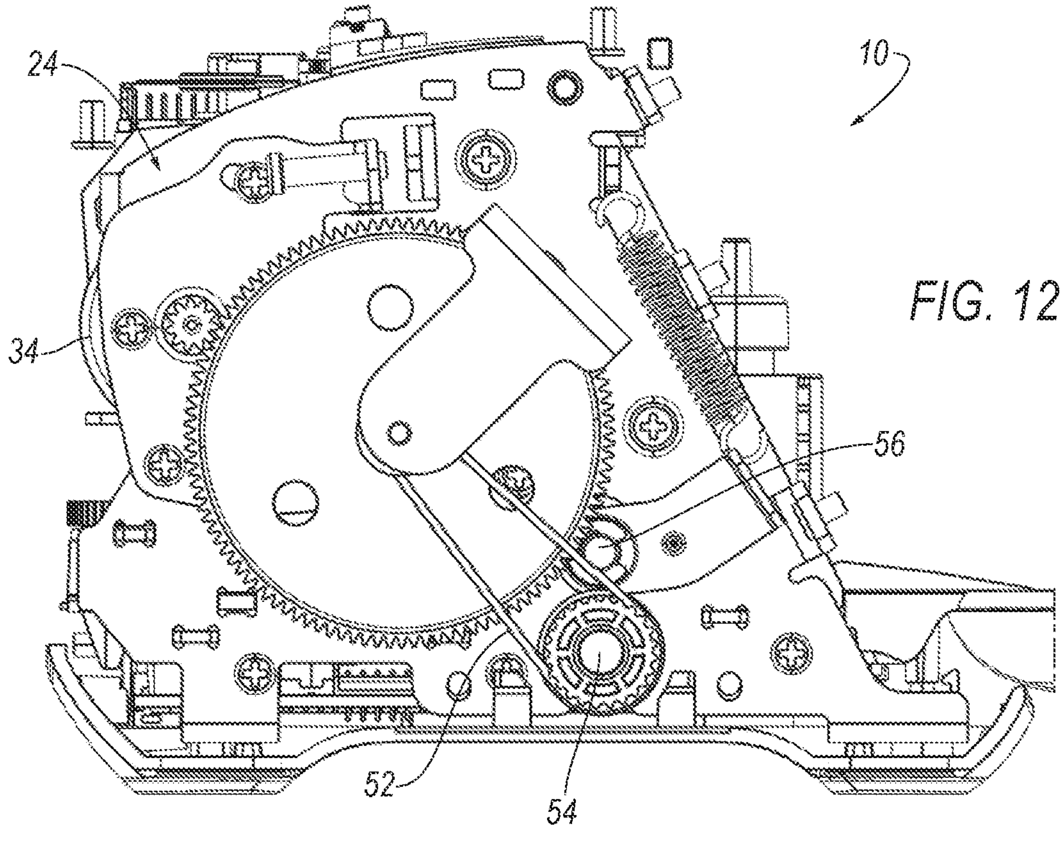
FIG. 12 is a left side view of a cutting machine with the outer housing removed in order to illustrate an exemplary arrangement of internal working components, according to the principles of the present disclosure.

For further clarification of the arrangement of components of the plurality of components that are arranged within the right-side portion 24 of the outer housing 12 and the left-side portion 26 of the outer housing 12, with reference to FIGS. 11 and 12, side views of the cutting machine 10 with the outer housing 12 removed provides for an unobstructed view of the components due to the removal of the left-side portion 26 of the outer housing 12 and the right-side portion 24 of the outer housing 12, respectively. FIG. 11 illustrates the aforementioned belts 40, 44, which are driven by the X-direction motor 32 and the Z-direction motor 30, respectively. FIG. 12 illustrates a belt 52, which is driven by the Y-direction motor 34, through a series of gears. The belt 52 drives a lower roller bar 54, which an upper roller bar 56 is biased against via a spring. Together, the upper roller bar 56 and the lower roller bar 54 define the roller assembly 18 that engages the workpiece 100 that is fed into the cutting machine 10. In some implementations, the roller assembly 18 actuates movement of the workpiece 100 forwardly-and-backwardly in the Y-direction of the X-Y-Z coordinate system of FIG. 1A. An exemplary arrangement of the upper roller bar 56 of the roller assembly 18 may be seen at FIG. 1A.

Figure 13:
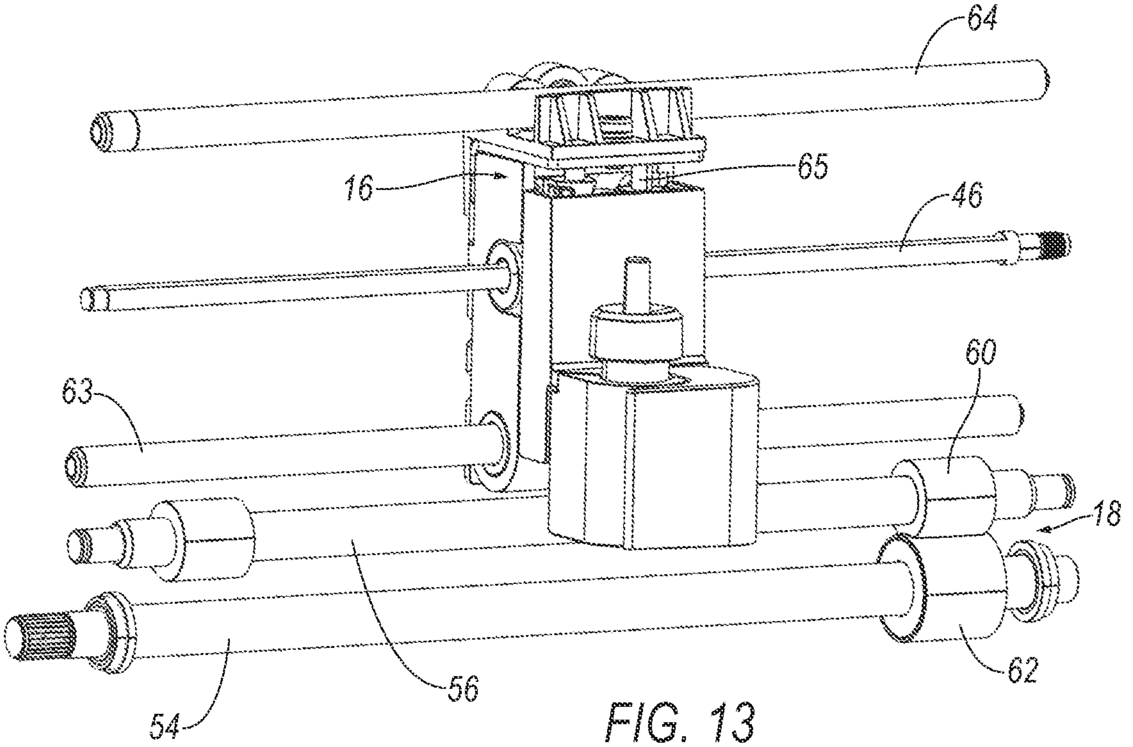
FIG. 13 is a front perspective view of an exemplary sub-assembly of a cutting machine that includes a carriage and a plurality of number of drive shafts and carriage guide bars, according to the principles of the present disclosure.
Figure 14:
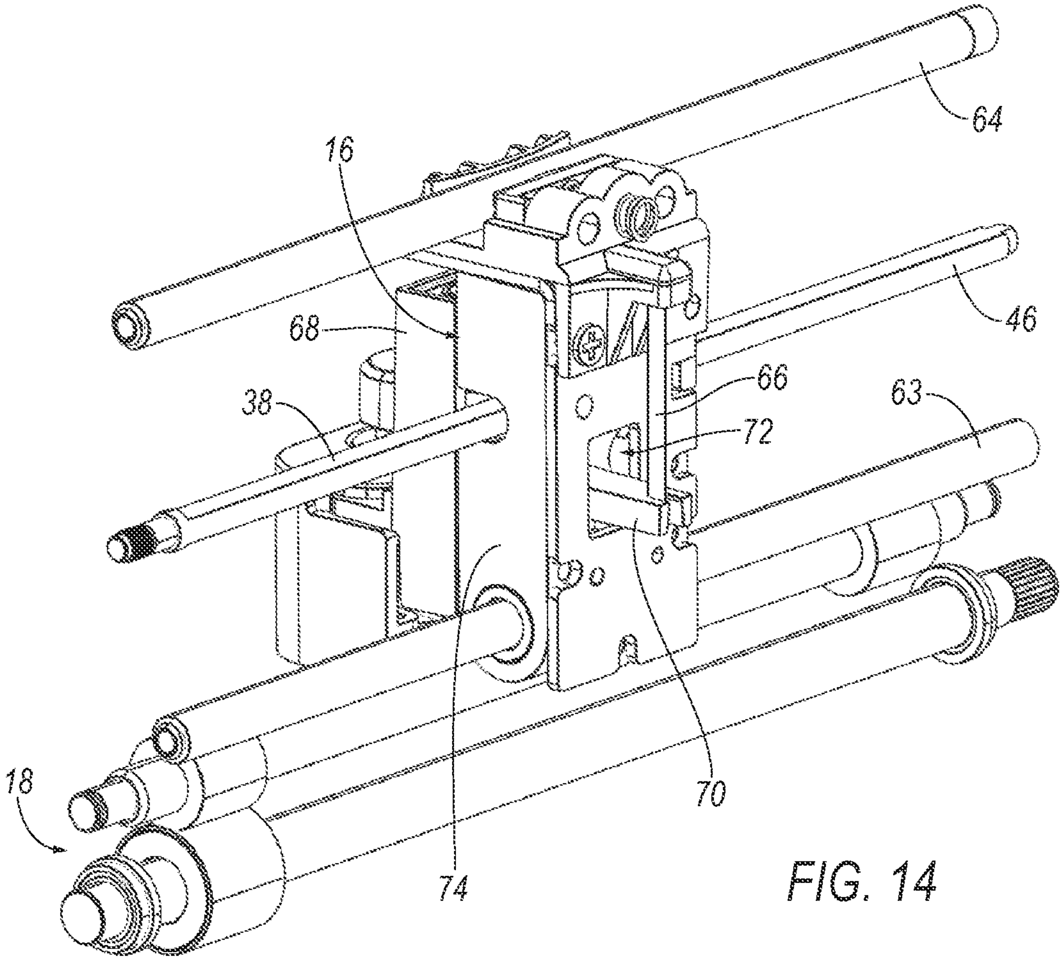
FIG. 14 is a rear perspective view of the sub-assembly of FIG. 13.

Referring to FIGS. 13 and 14, the carriage 16 and various guide bars, actuation shafts, and roller bars are shown isolated from the rest of the components of the plurality of components of the cutting machine 10 for illustrative purposes. The roller assembly 18, as noted above, may include the lower roller bar 54 and the upper roller bar 56 with respective rollers 62, 60 pressing against one another to feed the workpiece 100 through the cutting machine 10 forwardly-and-backwardly in the Y-direction of the X-Y-Z coordinate system of FIG. 1A.

In addition to the roller assembly 18 that provides a "pressing" force to the workpiece 100, FIGS. 13 and 14 also illustrate front and rear perspective views, respectively, of the double D-shaft 46. As noted above, the double D-shaft 46 engages the rack-and-pinion mechanism 50 in order to actuate the carriage 16 and the tool 38 upwardly and downwardly vertically in the Z-direction of the X-Y-Z coordinate system of FIG. 1A.

As noted above, because of the configuration of the plurality of components associated with the off-axis Z-drive of the carriage 16, the carriage 16 is completely passive as it is acted upon to move in the X-direction of the X-Y-Z coordinate system of FIG. 1A and in the Z-direction of the X-Y-Z coordinate system of FIG. 1A. Because the carriage 16 is passive and does not house any active drive mechanisms such as, for example, motors, wiring, solenoids, or other active drive mechanisms, the carriage 16 is light weight and small. The small form factor of the carriage 16 maximizes the distance it can travel back and forth in the X-direction of the X-Y-Z coordinate system of FIG. 1A in order to maximize available lateral cutting space of the cavity 22 of the outer housing 12. In addition, because the carriage 16 is light-weight, an amount of power needed to cause movement of the carriage 16 as well as control of the tool 38 is reduced.

With reference to FIGS. 13 and 14, the carriage 16 is slidably secured to a lower guide bar 63 and an upper guide bar 64 in order to ensure that the carriage 16, which is passively-driven, maintains alignment within the X-Z plane, the X-Y plane, and the Z-Y plane at each point to which the carriage 16 is moved during use of the cutting machine 10. The upper guide bar 64 interfaces with the carriage 16 at an upper end thereof and the lower guide bar 63 interfaces with the carriage 16 at a lower end thereof.

Furthermore, a front portion 68 of the carriage 16 is guided by a vertical rod 65 as the carriage 16 travels upwardly and downwardly vertically in the Z-direction of the X-Y-Z coordinate system of FIG. 1A. In some configurations, the vertical rod 65 is secured to a rear portion 74 of the carriage 16. The front portion 68 of the carriage 16 may also include an arm 70 that extends rearwardly and slidably engages the vertical guide bar 66. The extension of the arm 70 through the carriage 16 and out the back thereof increases the moment arm between the arm 70 and the vertical guide bar 66 and the vertical rod 65 in order to further stabilize the carriage 16 during use of the cutting machine 10.

In order to accommodate the arm 70 extending through the carriage 16 from the front portion 68 to the vertical guide bar 66, the carriage 16 includes an opening 72 that allows the arm 70 to slide upwardly and downwardly as the front portion 68 is actuated in the Z-direction of the X-Y-Z coordinate system of FIG. 1A while the rear portion 74 of the carriage 16 remains static in the Z-direction of the X-Y-Z coordinate system of FIG. 1A during use of the cutting machine 10. These various guide bars, rods, and arms 63, 64, 65, 66 and 70 ensure that the carriage 16 does not rock back and forth, tilt, twist, or otherwise fall out of position during use of the cutting machine 10.

Figure 15:
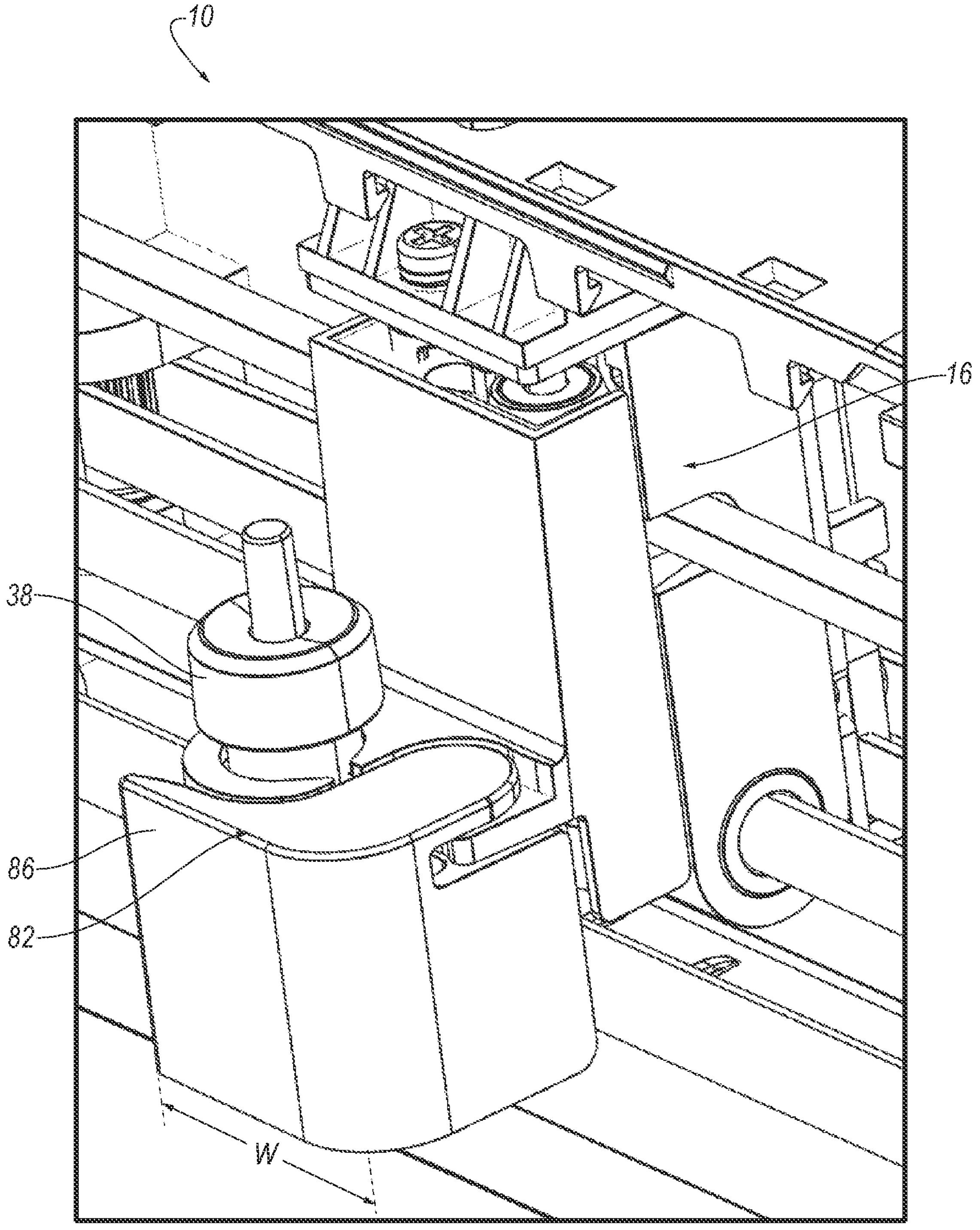
FIG. 15 is a top right perspective view of an exemplary tool clamp of a cutting machine arranged in a closed configuration, according to the principles of the present disclosure.

Referring to FIG. 15, an exemplary tool clamp 82 of the carriage 16 is shown. The tool clamp 82 functions by holding or removably-retaining the tool 38 within or on the carriage 16. The tool clamp 82 may include, for example, a small form-factor that is easy-to-use, functioning as a miniaturized clamp for accommodating the tool 38 on the carriage 16. The tool clamp 82 may be configured narrowly so as to not extend laterally beyond the carriage 16 within lateral cutting space of the cavity 22 of the outer housing 12. In this way, the tool clamp 82 does not limit X-direction travel of the carriage 16 back and forth within lateral cutting space of the cavity 22 of the outer housing 12 In some configurations, the total width W in the X-direction of the tool clamp 82 may be about 1-inch. In other configurations, the total width W of the tool clamp 82 may be more or less than 1-inch.

Figure 16:
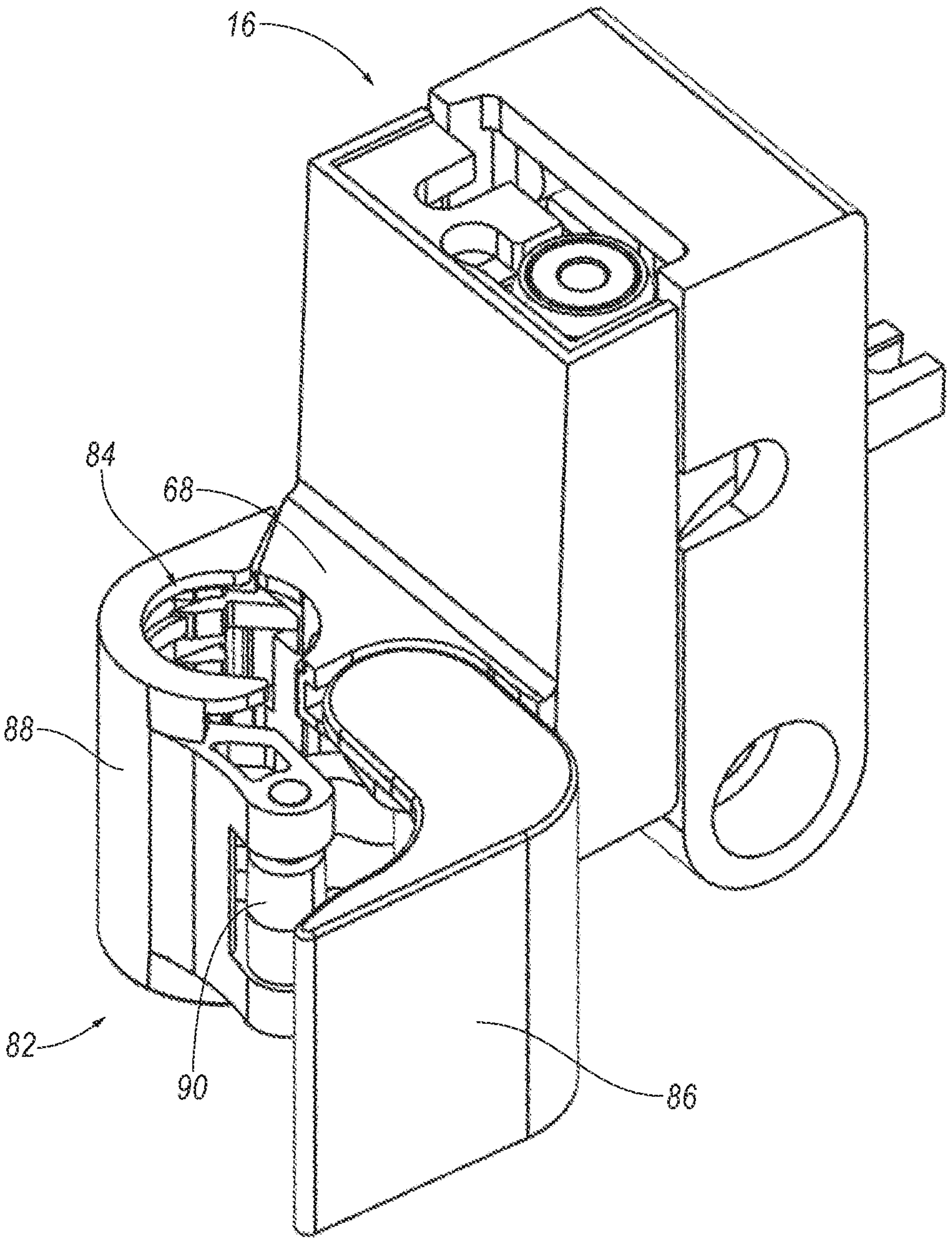
FIG. 16 is a top right perspective view of the tool clamp of FIG. 15 arranged in an open configuration.

In some configurations, the tool clamp 82 may be an over-center, dual-lock, four-bar linkage system. With reference to FIG. 15, the tool clamp 82 is shown arranged in a closed orientation, whereby the tool 38 is secured to the front portion 68 of the carriage 16. With reference to FIG. 16, the tool clamp 82 is shown arranged in an open orientation, whereby a tool opening 84 is expanded to allow the removal and insertion of the tool 38. In the open position according to FIG. 16, a clamp lever 86 has been rotated outwardly. In such an open configuration, all four bars of the linkage system can be seen; these bars may include, for example: the lever 86; the front portion 68 of the carriage 16; an arm 88; and a slider 90. The four bars 86, 68, 88, 90 are rotatably engaged with adjoining bars via pins (see, e.g., pins 92 at FIG. 17), which will be described in more detail below.

In order to reduce effects of material creep of one or more components associated with the tool clamp 82, materials may be selected that have properties that reduce material creep after molding. Examples of such materials may include, but are not limited to: glass-filled polycarbonate; and glass-filled nylon.

Figure 17:
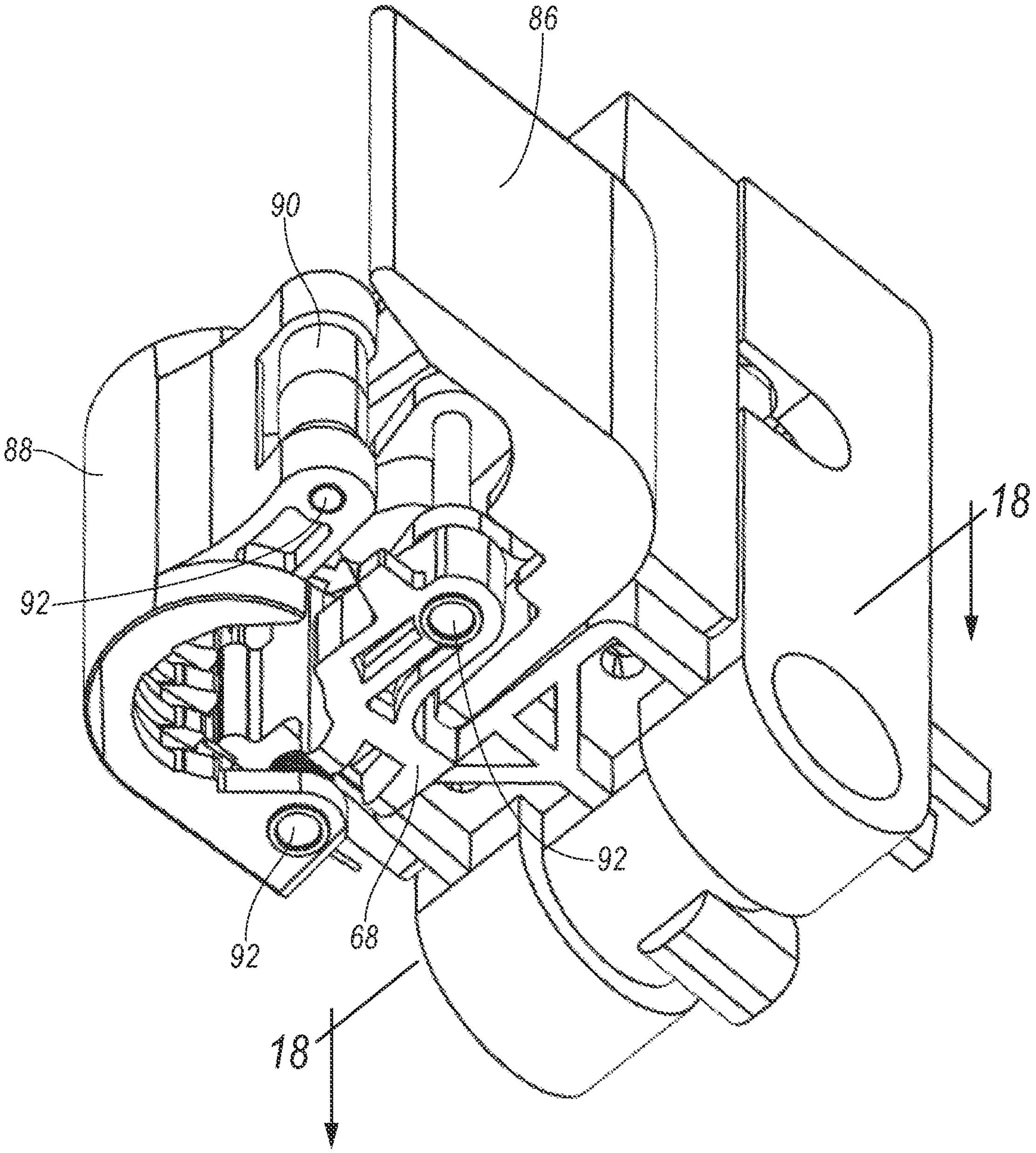
FIG. 17 is a bottom right perspective view of the tool clamp of FIG. 15 arranged in the open configuration.

Referring to FIG. 17, a lower perspective view of the tool clamp 82 is shown with the tool clamp 82 arranged in an open orientation. The bars 68, 86, 90, 88 can be seen connected by three pins 92. Referring back to FIG. 15, from views other than the bottom view illustrated at FIG. 17, the pins 92 are hidden from view during use. The pins 92 are hidden from view to form a clean, aesthetically pleasing tool clamp 82 for an end user. In order to hide the pins 92 from view during use of the cutting machine 10, the pins 92 are inserted from below during assembly of the tool clamp 82. As seen at FIG. 17, the pins 92 are held in place from below, after being inserted, via raised ring features extending from the bars 68, 86, 90 immediately surrounding the pins 92. In some configurations, the rings holding the pins 92 within the bars 68, 86, 90 from below may be formed using, for example, a heat stake manufacturing method.

Securing adjacent bars 68, 86, 90 of the tool clamp 82 via the pins 92 in such a way may provide a sufficient clamping force and movement of the bars 68, 86, 90 between the opened orientation and the closed orientation of the tool clamp 82 without the material of the bars 68, 86, 90 rubbing against each other. As such, the bars 68, 86, 90 are designed so as to not include, for example, any contacting cam-follower surfaces. In this way, material wear due to rubbing between the bars 68, 86, 90 is minimized. Also, the pins 92 provide lower frictional resistance to opening and closing the tool clamp 82, which provides a smoother tactile experience to the end user.

Figure 18:
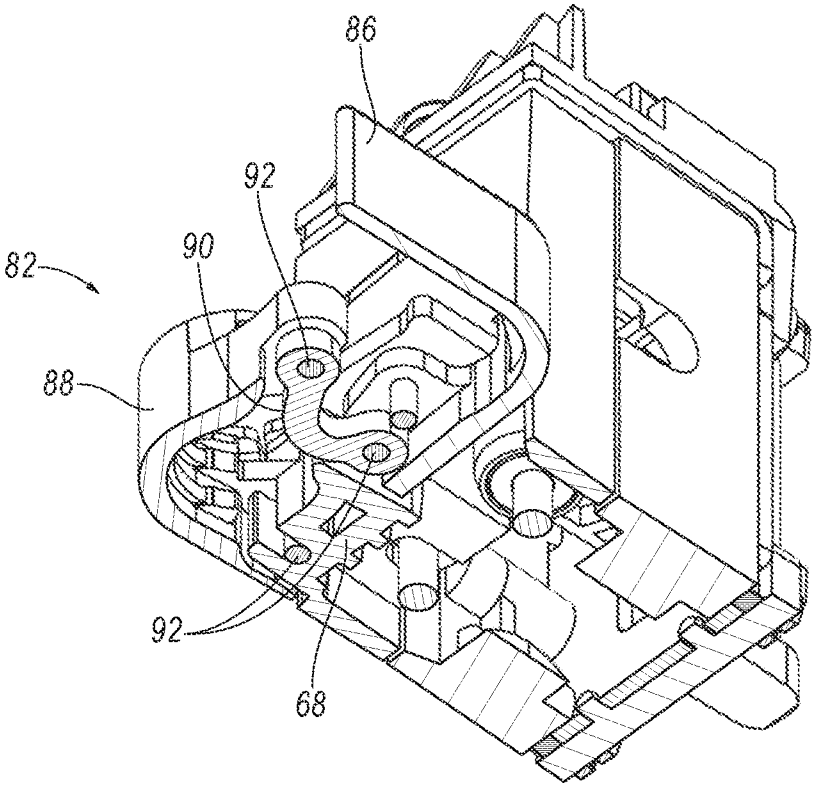
FIG. 18 is a cross-sectional view according to line 18-18 of FIG. 17 showing the tool clamp arranged in the open configuration.
Figure 19:
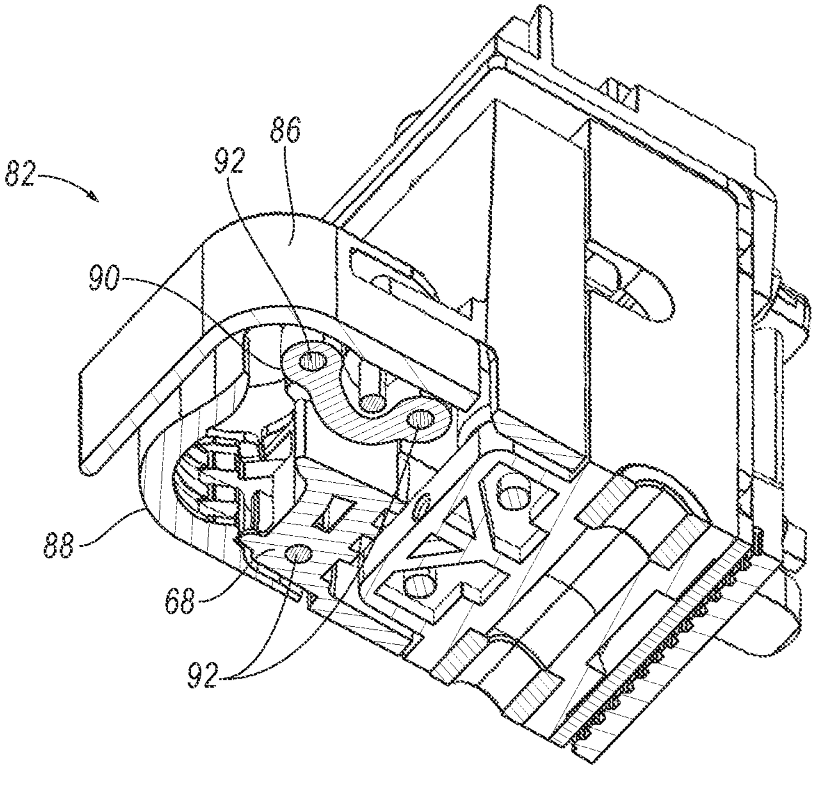
FIG. 19 is another cross-sectional view referenced from FIG. 18 but showing the tool clamp arranged in the closed configuration.

For additional reference and clarification, FIGS. 18 and 19 illustrate cross-sectional views of an exemplary implementation of the tool clamp 82 taken along line 18-18 of FIG. 17. FIG. 18 illustrates the tool clamp 82 in a closed orientation whereas FIG. 19 illustrates the tool clamp 82 arranged in an open orientation.

Figure 20:
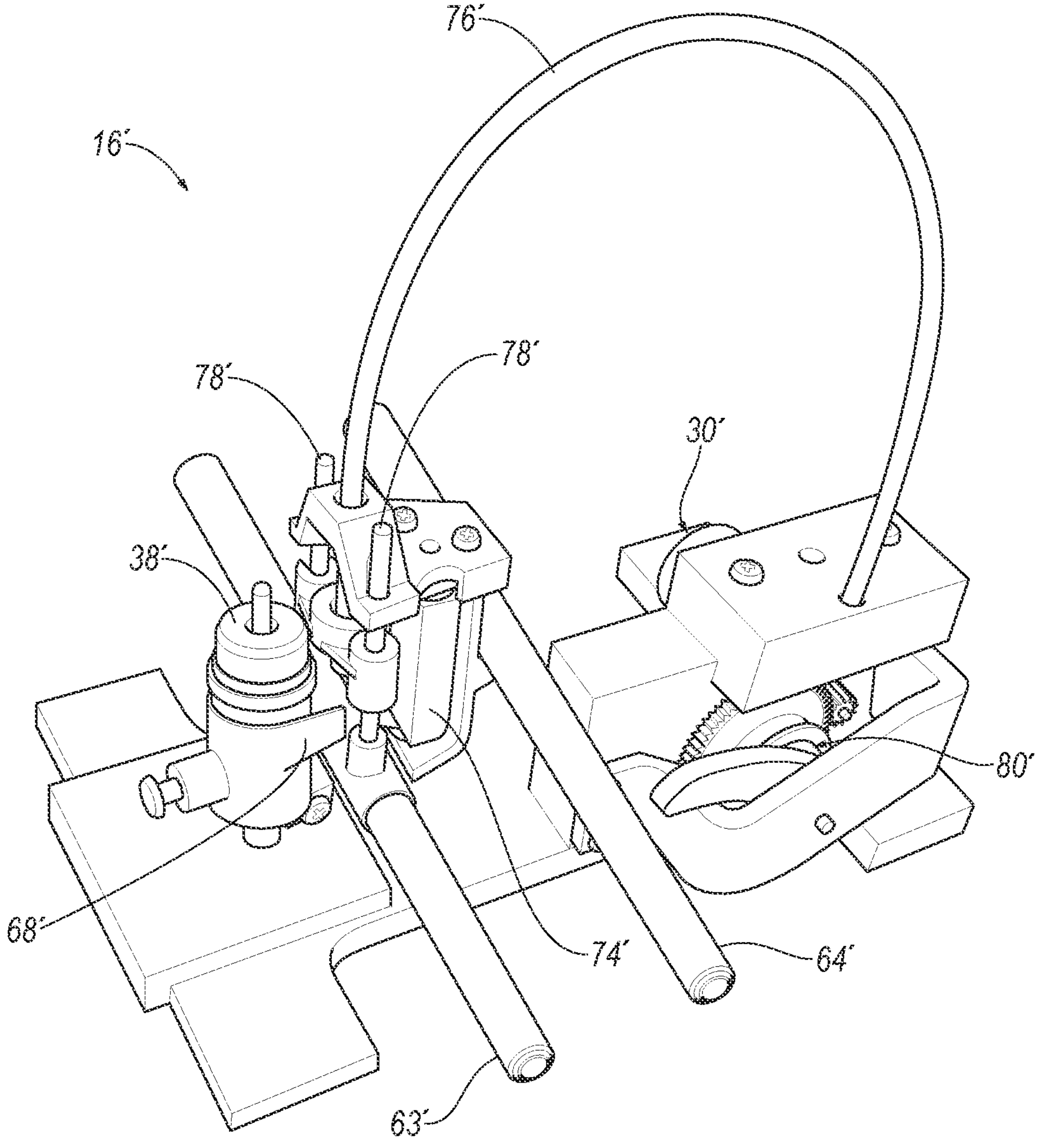
FIG. 20 is front perspective view of an exemplary carriage that is configured for utilization with the cutting machine of FIG. 1A, according to the principles of the present disclosure.
Figure 21:
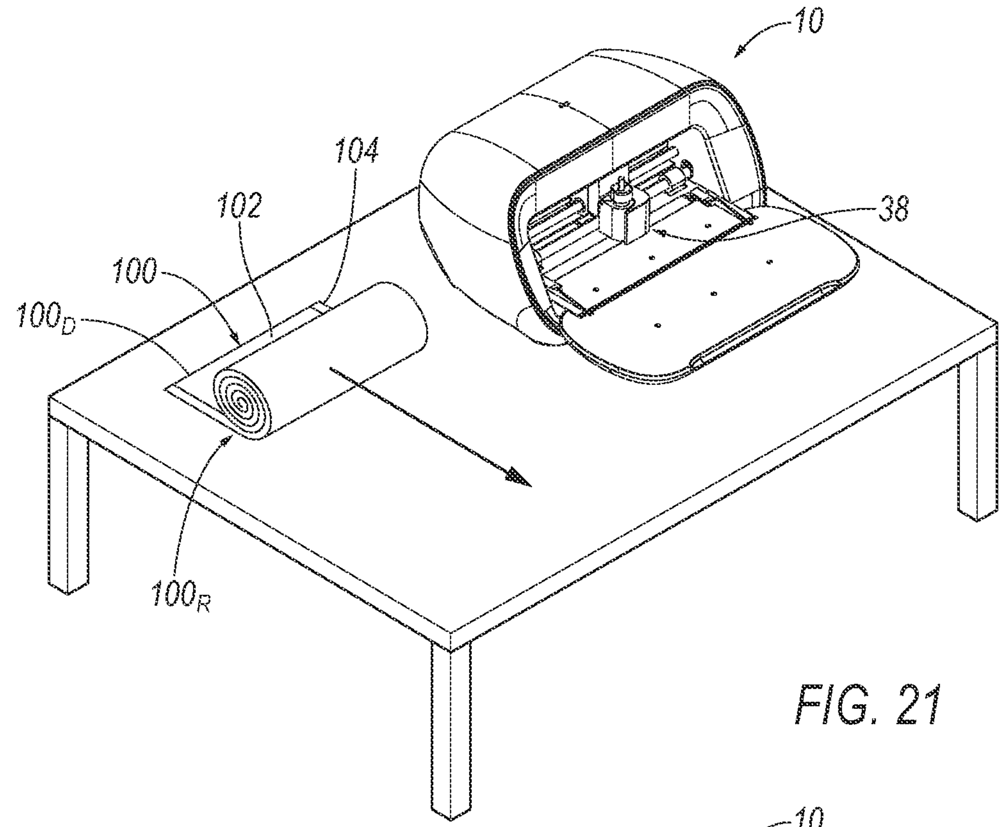
FIG. 21 is a perspective view of a first step of using a system including the cutting machine of FIG. 1 that is configured to conduct work on a workpiece material, according to the principles of the present disclosure.

Referring to FIG. 20, an exemplary carriage 16' is shown. The carriage 16' may include a front portion 68' that is actuated upwardly and downwardly in the Z-direction of the X-Y-Z coordinate system of FIG. 1A during use of the cutting machine 10 to raise and lower a tool 38'. The carriage 16' may be configured to slidably secure to one or more guide bars 63', 64', as described above with reference to other embodiments of the carriage 16, to be actuated back and forth in the X-direction of the X-Y-Z coordinate system of FIG. 1A via one or more drive-belts, gears, or combinations thereof as described herein.

A Z-drive cable 76' engages a movable front portion 68' of the carriage 16' in order to actuate the tool 38' upwardly-and-downwardly vertically in the Z-direction of the X-Y-Z coordinate system of FIG. 1A as guided by guide pins 78. A Z-direction motor 30' rotates one or more gears 80' back and forth. At least one gear 80' engages the Z-drive cable 76' such that when the gear 80' rotates back and forth, the length of the Z-drive cable 76' extending between the gear 80' and the carriage 16' increases and decreases accordingly, thus actuating front portion 68', and, therefore, the tool 38', upwardly-and-downwardly vertically in the Z-direction of the X-Y-Z coordinate system of FIG. 1A.

In such an exemplary implementation, the Z-drive cable 76' actuates the tool 38' rather than the double D-shaft 46' and the rack-and-pinion mechanism 50'. Accordingly, the carriage 16' maintains its passive characteristics in a similar manner as described above with respect to the operation of the carriage 16, including the absence of any active drive mechanisms, such as motors, solenoids, or other drive electronics, on the carriage 16' itself.

Figure 22:
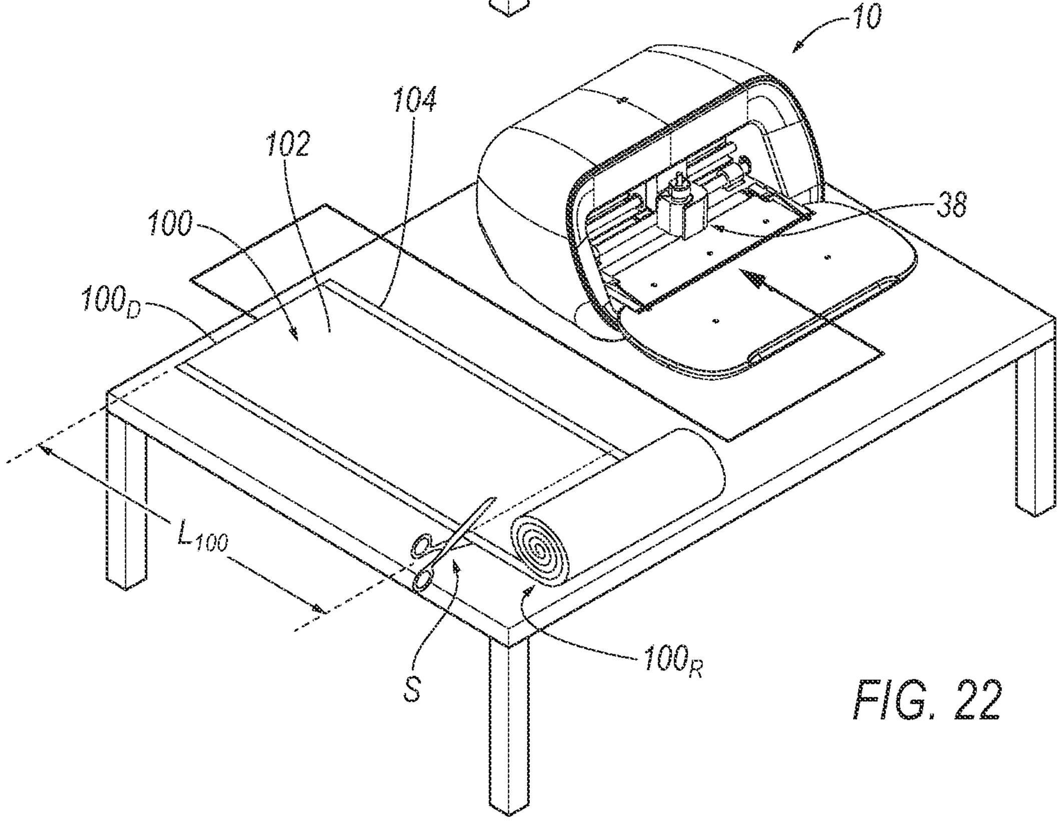
FIG. 22 is a perspective view of a second step of using the system according to FIG. 21.

With reference to FIGS. 21-24, a method of using the cutting machine 10 is shown. The workpiece 100 may be configured to be flexible enough to be efficiently packaged and shipped, for example in a roll $\mathbf{100}_R$. The roll $\mathbf{100}_R$ of workpiece 100 allows large lengths of the workpiece 100 to be stored in a small or reduced volume. However, long lengths of rolled workpiece 100 may be difficult to handle during cutting operations of the cutting machine 10. Accordingly, as seen at FIG. 22, an end user can place the roll $\mathbf{100}_R$ of workpiece 100 to be cut near the cutting machine 10 and manually reel a length $L_{100}$ of the workpiece 100 from the roll $\mathbf{100}_R$. Once a desired length $L_{100}$ of the workpiece 100 is reeled from the roll $\mathbf{100}_R$, the end user may separate the length $L_{100}$ of the workpiece 100 from the roll $\mathbf{100}_R$ by, for example, cutting the workpiece 100 with scissors S. In other configurations, a distal end $\mathbf{100}_D$ of the roll $\mathbf{100}_R$ of the workpiece 100 may be inserted into the cutting machine, and, as such, the cutting machine 10 may reel the length $L_{100}$ of the workpiece 100 from the roll $100_R$ of the workpiece 100 without any manual intervention from an end user such as, for example, cutting the workpiece 100 with scissors S.

Figure 23:
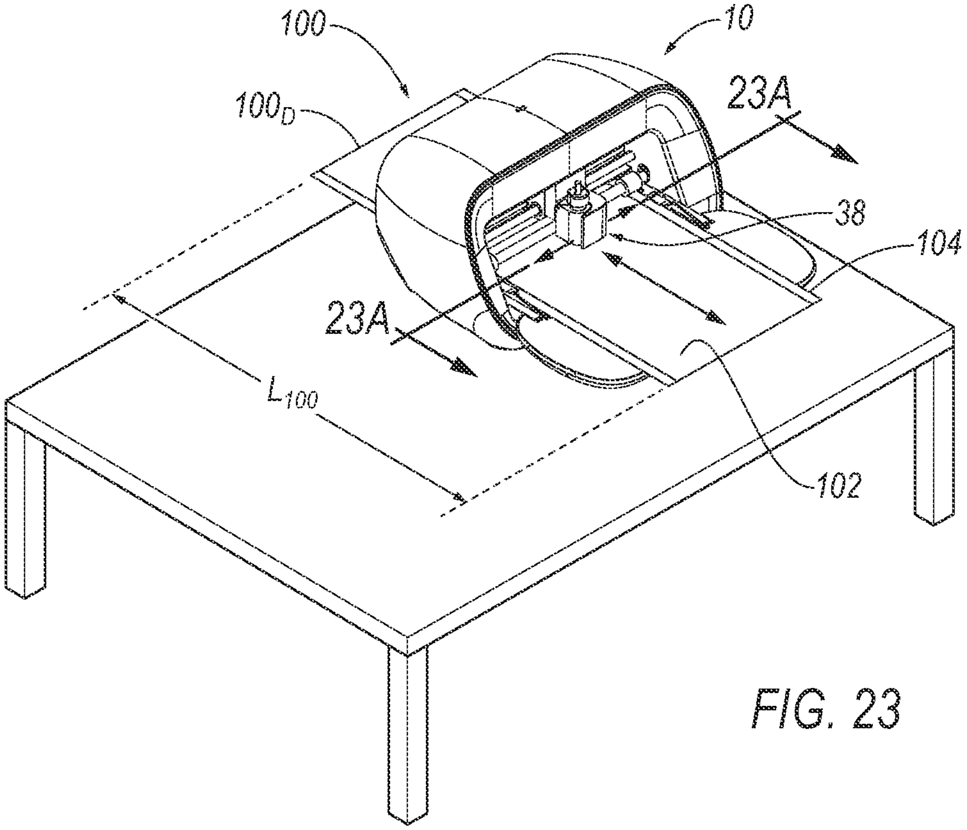
FIG. 23 is a perspective view of a third step of using the system according to FIG. 21.
Figure 23A:
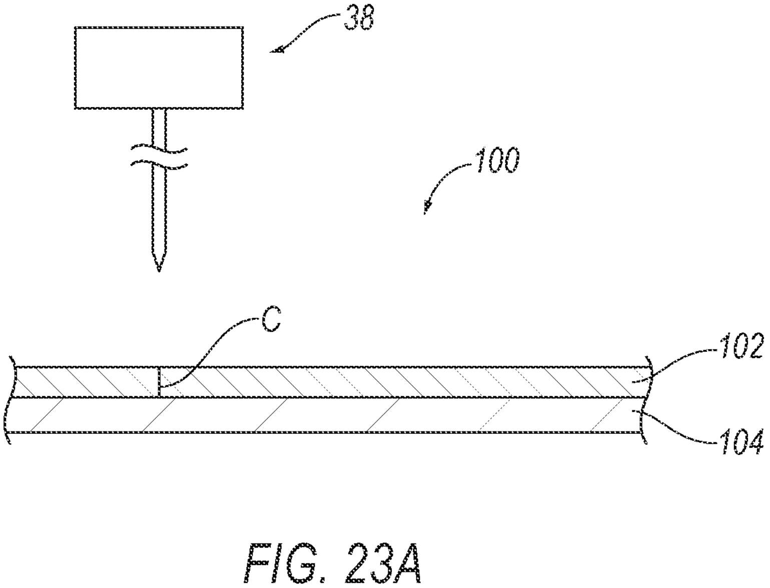
FIG. 23A is a cross-sectional view according to line 23A-23A of FIG. 23.
Figure 24:
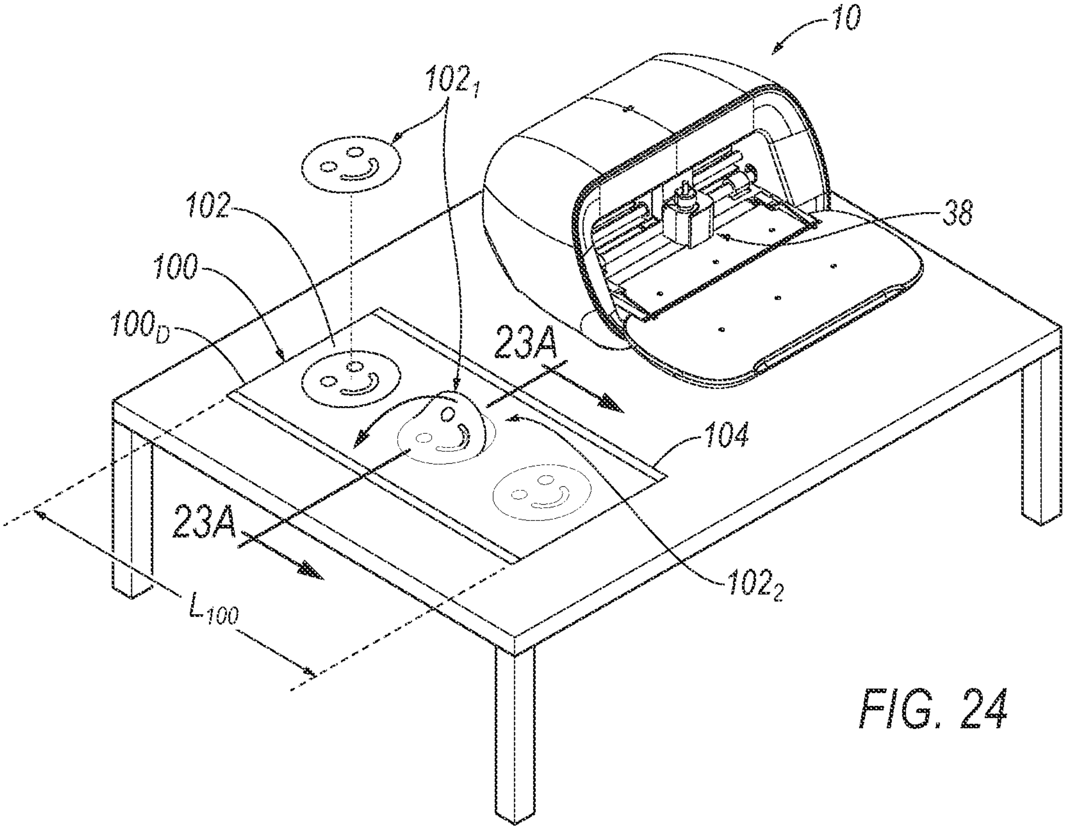
FIG. 24 is a perspective view of a fourth step of using the system according to FIG. 21.
Figure 24A:
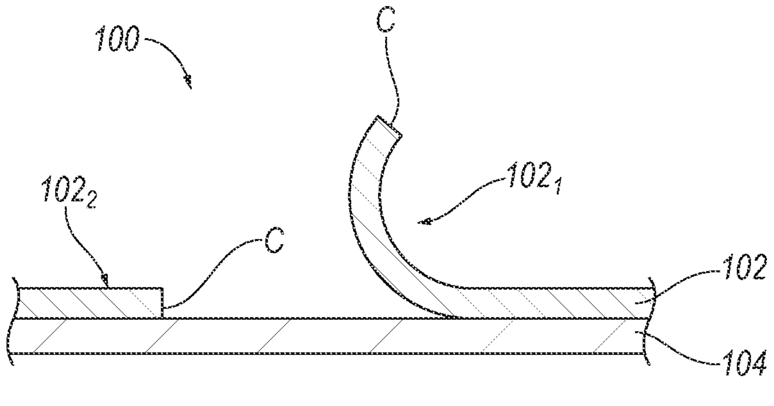
FIG. 24A is a cross-sectional view according to line 24A-24A of FIG. 24.

With reference to FIGS. 23-24, the cutting machine 10 is uniquely configured to operate with the workpiece 100 that may be defined by the upper layer of workpiece material 102 and the lower layer of workpiece support material 104. As seen at FIG. 23, after the workpiece 100 is inserted into the cutting machine 10, the upper layer of workpiece material 102 may be cut (see, e.g., cut C of FIG. 23A) by the tool 38 while the lower layer of workpiece support material 104 is not cut C by the tool 38, and defines a non-rigid, flexible, rollable material that permits the workpiece 100 to be arranged in a roll $100_R$ as described above. Accordingly, as seen at FIGS. 24 and 24A, after the upper layer of workpiece material 102 is cut C, a first portion $102_1$ of the upper layer of workpiece material 102 may be subsequently removed from the lower layer of workpiece support material 104 while a second portion 1022 of the upper layer of workpiece material 102 remains removably-secured to the lower layer of workpiece support material 104. As such, the lower layer of workpiece support material 104 that forms a portion of the workpiece 100 may be configured for single use and disposal thereafter.

As noted above, each of the embodiments described in the detailed description above may include any of the features, options, and possibilities set out in the present disclosure, including those under the other independent embodiments, and may also include any combination of any of the features, options, and possibilities set out in the present disclosure and figures. Further examples consistent with the present teachings described herein are set out in the following numbered clauses:

Clause 1: A cutting machine, comprising a working surface; a carriage disposed above the working surface; a tool removably secured to the carriage, the tool configured to be manipulated up-and-down in a Z-direction, back-and-forth in an X-direction, and forward-and-backward in a Y-direction relative to the working surface; and an off-axis Z-drive mechanism configured to manipulate the tool up-and-down in the Z-direction.

Clause 2: The cutting machine of clause 1, wherein the carriage is passive.

Clause 3: The cutting machine of clause 1 or 2, further comprising a first motor disposed separate from and behind the carriage and a double D-shaft configured to be rotated by the first motor, wherein a rotation of the double D-shaft causes a front portion of the carriage to move up-and-down in the Z-direction.

Clause 4: The cutting machine of clause 3, the off-axis Z-drive further comprising at least one drive gear and at least one drive belt, wherein the at least one drive gear and the at least one drive belt transfers rotary motion of the first motor to a rotary motion of the double D-shaft during use.

Clause 5: The cutting machine of clause 4, the cutting machine further comprising a side portion disposed laterally in the X-direction relative to the carriage, wherein: at least one of the at least one drive gear and at least one of the at least one drive belt are disposed within the side portion; and the first motor is disposed behind the carriage in the Y-direction and separated from the first motor by an interior wall.

Clause 6: A cutting machine, comprising: a working surface; a passive carriage disposed above the working surface, the passive carriage comprising a first portion and a second portion; a drive belt configured to actuate the passive carriage back-and-forth laterally relative to the workings surface; and an off-axis Z-drive mechanism configured to actuate a first portion of the carriage up-and-down vertically relative to the working surface.

Clause 7: The cutting machine of clause 6, wherein an first motor is disposed behind the passive carriage drives the drive belt, the drive belt extending from behind the passive carriage, into a side portion of the cutting machine, and from the side portion to the passive carriage, the side portion of the cutting machine disposed laterally to the side of the passive carriage.

Clause 8: The cutting machine of clause 6 or 7, the off-axis Z-drive comprising: a double D-shaft engaging the first portion of the passive carriage via a rack-and-pinion mechanism; a Z-drive belt disposed within a side portion of the cutting machine, the side portion being disposed laterally to the side of the passive carriage; and a Z-drive motor disposed behind the passive carriage and outside the side portion, the Z-drive motor configured to rotate the double D-shaft via the Z-drive belt and one or more gears.

Clause 9: The cutting machine of any of clauses 6 through 8, wherein: the passive carriage comprises a vertical guide bar extending behind the passive carriage and secured to the second portion of the passive carriage; the first portion of the passive carriage comprises an extension arm extending rearward from the first portion through the second portion, the extension arm being slidably engaged with the vertical guide bar; and the second portion of the passive carriage comprises an opening through which the extension arm of the first portion extends.

Clause 10: A cutting machine, comprising: a working surface; a carriage disposed above the working surface, the carriage including a tool clamp configured to releasably secure a tool to the carriage, the blade clamp comprising a four-bar linkage system having bars rotatably connected via pins, wherein the pins are hidden from view during an operation of the cutting machine.

Clause 11: The cutting machine of clause 10, wherein the bars of the four-bar linkage system do not form any cam-follower surfaces during an opening or closing of the tool clamp.

Clause 12: The cutting machine of clauses 10 or 11, wherein at least one of the bars of the four-bar linkage system comprises glass-filled nylon.

Clause 13: The cutting machine of any of clauses 10 through 12, wherein at least one of the bars of the four-bar linkage system comprises glass-filled polycarbonate.

Clause 14: A cutting machine, comprising: a working surface; a carriage disposed above the working surface a tool removably secured to the carriage, the tool configured to move (i) toward the working surface along a first axis, (ii) relative to the working surface along a second axis transverse to the first axis, and (iii) relative to the working surface along a third axis transverse to the first axis and the second axis; and a drive mechanism offset from the first axis and configured to move the tool along the first axis.

Clause 15: The cutting machine of clause 14, wherein the carriage is passive.

Clause 16: The cutting machine of any of clauses 14 through 15, wherein the drive mechanism comprises: a first motor separated from the carriage; and a shaft coupled to the first motor and the tool and configured to move a front portion of the carriage along the first axis.

Clause 17: The cutting machine of clause 16, wherein the drive mechanism further comprises a drive gear and a drive belt coupled to the first motor and the shaft, the drive gear and the drive belt configured to rotate the shaft.

Clause 18: The cutting machine of clause 17, wherein the drive gear and the drive belt are configured to transfer rotary motion of the first motor to the shaft.

Clause 19: The cutting machine of any of clauses 17 through 18, wherein the shaft defines a double-D cross-sectional shape.

Clause 20: The cutting machine of clause 19, wherein the drive gear defines an aperture having a double-D shape, and wherein the shaft is disposed within the aperture.

Clause 21: The cutting machine of any of clauses 17 through 20, further comprising: a side portion offset from the carriage relative to the second axis; and a wall dividing the cutting machine into a front portion and a rear portion, wherein: the drive gear and the drive belt are disposed within the side portion; the first motor is disposed within the rear portion; and the carriage is disposed within the front portion.

Clause 22: A cutting machine, comprising: a working surface; a passive carriage disposed above the working surface, the passive carriage comprising a first portion and a second portion; a drive belt configured to move the passive carriage in a first direction relative to the workings surface; and a drive mechanism separated from the passive carriage and configured to move a first portion of the carriage in a second direction relative to the working surface, the second direction transverse to the first direction.

Clause 23: The cutting machine of clause 22, further comprising: a side portion offset from the passive carriage in the first direction; and a first motor disposed behind the passive carriage and configured to drive the drive belt, the drive belt extending (i) from behind the passive carriage, into the side portion of the cutting machine, and (ii) from the side portion to the passive carriage.

Clause 24: The cutting machine of any of clauses 22 through 23, further comprising a side portion offset from the passive carriage in the first direction, the drive mechanism comprising: a rack-and-pinion mechanism coupled to the passive carriage; a shaft engaging the rack-and-pinion mechanism; a drive belt disposed within the side portion; and a motor disposed behind the passive carriage and outside of the side portion, the motor configured to rotate the shaft via the drive belt and one or more gears.

Clause 25: The cutting machine of clause 24, wherein the shaft defines a double-D cross-sectional shape.

Clause 26: The cutting machine of clause 25, wherein a first gear of the one or more gears defines an aperture having a double-D shape, and wherein the shaft is disposed within the aperture.

Clause 27: The cutting machine of any of clauses 22 through 26, wherein: the passive carriage comprises a vertical guide bar extending behind the passive carriage and secured to the second portion of the passive carriage; the first portion of the passive carriage comprises an arm extending rearward from the first portion through the second portion, the arm being slidably engaged with the vertical guide bar; and the second portion of the passive carriage comprises an opening, the arm of the first portion extending through the opening.

Clause 28: A cutting machine visible along a line of sight, the cutting machine comprising: a working surface; and a carriage disposed above the working surface, the carriage including a tool clamp configured to secure a tool to the carriage, the tool clamp comprising a first bar and a second bar, the second bar pivotally coupled to the first bar by a first pin intersecting the line of sight, the first bar operable to move between (i) a first orientation intersecting the line of sight and (ii) a second orientation offset from the line of sight.

Clause 29: The cutting machine of clause 28, wherein the tool clamp further comprising a third bar pivotally coupled to the second bar, and a fourth bar pivotally coupled to the third bar, and wherein the first bar, the second bar, the third bar, and the fourth bar do not form a cam-follower surface during movement of the first bar between the first orientation and the second orientation.

Clause 30: The cutting machine of any of clauses 28 through 29, wherein at least one of the first bar or the second bar is formed at least in part from a glass-filled nylon.

Clause 31: The cutting machine of any of clauses 28 through 30, wherein at least one of the first bar or the second bar is formed at least in part from a glass-filled polycarbonate.

Clause 32: A cutting assembly comprising: a first drive mechanism; a second drive mechanism; and a carriage comprising: a front portion operatively coupled to the first drive mechanism; and a rear portion coupled to the front portion and operatively coupled to the second drive mechanism, the rear portion configured to move (i) with the front portion in a first direction upon actuation of the second drive mechanism and (ii) relative to the front portion in a second direction transverse to the first direction upon actuation of the first drive mechanism, wherein the second portion is disposed between the first portion and at least one of the first drive mechanism or the second drive mechanism.

Clause 33: The cutting assembly of clause 32, wherein: the second drive mechanism includes a drive gear and a drive belt offset from the carriage in the first direction, and the first drive mechanism is offset from the carriage in the second direction.

The articles “a,” “an,” and “the” are intended to mean that there are one or more of the elements in the preceding descriptions. The terms “comprising,” “including,” and “having” are intended to be inclusive and mean that there may be additional elements other than the listed elements. Additionally, it should be understood that references to “one embodiment” or “an embodiment” of the present disclosure are not intended to be interpreted as excluding the existence of additional implementations that also incorporate the recited features. Numbers, percentages, ratios, or other values stated herein are intended to include that value, and also other values that are “about” or “approximately” the stated value, as would be appreciated by one of ordinary skill in the art encompassed by implementations of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to implementations disclosed herein without departing from the spirit and scope of the present disclosure. Equivalent constructions, including functional “means-plus-function” clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words ‘means for’ appear together with an associated function. Each addition, deletion, and modification to the implementations that falls within the meaning and scope of the claims is to be embraced by the claims.

The terms "approximately," "about," and "substantially" as used herein represent an amount close to the stated amount that still performs a desired function or achieves a desired result. For example, the terms "approximately," "about," and "substantially" may refer to an amount that is within less than 5% of, within less than 1% of, within less than 0.1% of, and within less than 0.01% of a stated amount. Further, it should be understood that any directions or reference frames in the preceding description are merely relative directions or movements. For example, any references to "up" and "down" or "above" or "below" are merely descriptive of the relative position or movement of the related elements.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A cutting machine comprising:

a working surface;

a passive carriage disposed above the working surface, the passive carriage comprising a first portion and a second portion;

a drive mechanism separated from the passive carriage and configured to move a first portion of the carriage in a first direction relative to the working surface;

a drive belt configured to move the passive carriage in a second direction relative to the working surface, the second direction transverse to the first direction; and a side portion offset from the passive carriage in the second direction, wherein the drive belt is disposed within the side portion, wherein the drive mechanism comprises:

a rack-and-pinion mechanism coupled to the passive carriage;

a shaft engaging the rack-and-pinion mechanism; and a motor disposed behind the passive carriage and outside of the side portion, the motor configured to rotate the shaft via the drive belt and one or more gears.

2. The cutting machine of claim 1, wherein the shaft is coupled to the motor and is configured to move the first portion of the passive carriage along the first direction.

3. The cutting machine of claim 1, wherein the drive mechanism further comprises a drive gear coupled to the motor and the shaft, the drive gear and the drive belt configured to rotate the shaft.

4. The cutting machine of claim 3, further comprising a wall dividing the cutting machine into a front portion and a rear portion, wherein:

the drive gear and the drive belt are disposed within the side portion;

the motor is disposed within the rear portion; and the passive carriage is disposed within the front portion.

5. The cutting machine of claim 3, wherein the drive gear and the drive belt are configured to transfer rotary motion of the motor to the shaft.

6. The cutting machine of claim 1, wherein the shaft defines a double-D cross-sectional shape.

7. The cutting machine of claim 6, wherein a first gear of the one or more gears defines an aperture having a double-D shape, and wherein the shaft is disposed within the aperture.

8. A cutting machine comprising:

a working surface;

a passive carriage disposed above the working surface, the passive carriage comprising a first portion and a second portion;

a drive mechanism separated from the passive carriage and configured to move a first portion of the carriage in a first direction relative to the working surface; and a drive belt configured to move the passive carriage in a second direction relative to the working surface, the second direction transverse to the first direction, wherein the passive carriage comprises a vertical guide bar extending behind the passive carriage and secured to the second portion of the passive carriage, wherein the first portion of the passive carriage comprises an arm extending rearward from the first portion through the second portion, the arm being slidably engaged with the vertical guide bar, and wherein the second portion of the passive carriage comprises an opening, the arm of the first portion extending through the opening.

9. The cutting machine of claim 8, wherein the passive carriage further comprises a tool clamp configured to secure a tool to the passive carriage, the tool clamp comprising a first bar and a second bar, the second bar pivotally coupled to the first bar by a first pin intersecting the line of sight, the first bar operable to move between (i) a first orientation intersecting the line of sight and (ii) a second orientation offset from the line of sight.

10. The cutting machine of claim 9, wherein the tool clamp further comprises a third bar pivotally coupled to the second bar, and a fourth bar pivotally coupled to the third bar, and wherein the first bar, the second bar, the third bar, and the fourth bar do not form a cam-follower surface during movement of the first bar between the first orientation and the second orientation.

11. The cutting machine of claim 9, wherein at least one of the first bar or the second bar comprises a glass-filled nylon.

12. The cutting machine of claim 9, wherein at least one of the first bar or the second bar comprises a glass-filled polycarbonate.

* * * * *